US012359547B2

(12) United States Patent
Yeung et al.

(10) Patent No.: US 12,359,547 B2
(45) **Date of Patent: *Jul. 15, 2025**

(54) HYDRAULIC FRACTURING BLENDER SYSTEM

(71) Applicant: BJ Energy Solutions, LLC, Houston, TX (US)

(72) Inventors: Tony Yeung, Houston, TX (US); Nicholas Tew, Houston, TX (US); William Nieuwenburg, Houston, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 167 days.

This patent is subject to a terminal disclaimer.

(21) Appl. No.: 18/160,262

(22) Filed: Jan. 26, 2023

(65) Prior Publication Data

US 2023/0175375 A1 Jun. 8, 2023

Related U.S. Application Data

(63) Continuation of application No. 17/807,658, filed on Jun. 17, 2022, now Pat. No. 11,591,888.

(Continued)

(51) Int. Cl.

*E21B 43/00* (2006.01)
*B01F 23/50* (2022.01)

(Continued)

(52) U.S. Cl.

CPC .......... *E21B 43/2607* (2020.05); *B01F 23/59* (2022.01); *B01F 2101/49* (2022.01)

(58) Field of Classification Search

CPC ... B01F 2101/49; B01F 23/59; E21B 43/2607
See application file for complete search history.

(56) References Cited

U.S. PATENT DOCUMENTS 2,427,638 A 9/1947 Vilter et al.
2,572,711 A 10/1951 Fischer (Continued)

FOREIGN PATENT DOCUMENTS

CN 201275801 Y 7/2009
CN 102562020 A 7/2012

(Continued)

*Primary Examiner* — Anshu Bhatia
(74) *Attorney, Agent, or Firm* — Norton Rose Fulbright US LLP

(57) ABSTRACT

A multi-blender system for blending liquid and solid particulates together to prepare a fracturing fluid, the blender system can include a plurality of independently operable blender units each having components that can operate with either blender unit. Each component may be a modular blender component mounted to respective independent frames. The independent frames are configured to be independently removable, replaceable and movable to multiple positions in the blender system. In some aspects the multi-blender system can operate at different sand concentrations, instantaneously adjust flow rate to one or more of the components in either blender unit, provide control redundancy, and may continue to operate despite a failure of one of the major components.

15 Claims, 19 Drawing Sheets

Related U.S. Application Data

(60) Provisional application No. 63/202,660, filed on Jun. 18, 2021.

(51) Int. Cl.
*E21B 43/26* (2006.01)
*B01F 101/49* (2022.01)

(56) References Cited

U.S. PATENT DOCUMENTS

| | | | |
|---|---|---|---|
| 2,956,738 A | 10/1960 | Af et al. | |
| 3,401,873 A | 9/1968 | Privon et al. | |
| 3,692,434 A | 9/1972 | Schnear | |
| 4,050,862 A | 9/1977 | Buse | |
| 4,159,180 A | 6/1979 | Cooper et al. | |
| 4,311,395 A | 1/1982 | Douthitt et al. | |
| 4,460,276 A | 7/1984 | Arribau et al. | |
| 4,538,222 A | 8/1985 | Crain et al. | |
| 4,779,186 A | 10/1988 | Handke et al. | |
| 4,854,714 A | 8/1989 | Davis et al. | |
| 5,032,065 A | 7/1991 | Yamamuro et al. | |
| 5,167,493 A | 12/1992 | Kobari | |
| 5,441,340 A | 8/1995 | Cedillo et al. | |
| 5,634,777 A | 6/1997 | Albertin et al. | |
| 6,007,227 A | 12/1999 | Carlson | |
| 6,193,402 B1 | 2/2001 | Grimland et al. | |
| 6,401,472 B2 | 6/2002 | Pollrich et al. | |
| 6,644,844 B2 | 11/2003 | Neal et al. | |
| 6,669,453 B1 | 12/2003 | Breeden et al. | |
| 7,281,519 B2 | 10/2007 | Schroeder et al. | |
| 7,524,173 B2 | 4/2009 | Cummins | |
| 7,686,499 B2 | 3/2010 | Dykstra et al. | |
| 8,388,317 B2 | 3/2013 | Sung | |
| 8,500,215 B2 | 8/2013 | Gastauer et al. | |
| 8,641,399 B2 | 2/2014 | Mucibabic et al. | |
| 9,103,193 B2 | 8/2015 | Coli et al. | |
| 9,175,530 B2 | 11/2015 | Fia et al. | |
| 9,475,020 B2 | 10/2016 | Coli et al. | |
| 9,475,021 B2 | 10/2016 | Coli et al. | |
| 9,644,795 B2 | 5/2017 | Burnette | |
| 9,970,278 B2 | 5/2018 | Broussard et al. | |
| 10,107,085 B2 | 10/2018 | Coli et al. | |
| 10,221,668 B2 | 3/2019 | Coli et al. | |
| 10,227,855 B2 | 3/2019 | Coli et al. | |
| 10,246,984 B2 | 4/2019 | Payne et al. | |
| 10,300,830 B2 | 5/2019 | McIver et al. | |
| 10,406,962 B2 | 9/2019 | Hughes et al. | |
| 10,407,990 B2 | 9/2019 | Oehring et al. | |
| 10,408,031 B2 | 9/2019 | Oehring et al. | |
| RE47,695 E | 11/2019 | Case et al. | |
| 10,478,753 B1 | 11/2019 | Elms et al. | |
| 10,502,042 B2 | 12/2019 | Coli et al. | |
| 10,625,654 B2 | 4/2020 | Hughes et al. | |
| 10,675,601 B2 | 6/2020 | Fisher | |
| 10,738,928 B2 | 8/2020 | Arizpe et al. | |
| 10,774,630 B2 | 9/2020 | Coli et al. | |
| 10,808,512 B2 | 10/2020 | Koricanek | |
| 10,836,568 B2 | 11/2020 | Managan, II et al. | |
| 10,851,634 B2 | 12/2020 | Coli et al. | |
| 10,851,638 B2 | 12/2020 | Payne et al. | |
| 10,865,624 B1 | 12/2020 | Cui et al. | |
| 10,876,386 B2 | 12/2020 | Coli et al. | |
| 11,015,423 B1 | 5/2021 | Yeung et al. | |
| 11,066,915 B1 | 7/2021 | Yeung et al. | |
| 11,085,281 B1 | 8/2021 | Yeung et al. | |
| 11,091,992 B2 | 8/2021 | Broussard et al. | |
| 11,148,106 B2 | 10/2021 | Liu et al. | |
| 11,149,533 B1 | 10/2021 | Yeung et al. | |
| 11,168,681 B2 | 11/2021 | Boguski et al. | |
| 11,193,360 B1 | 12/2021 | Yeung et al. | |
| 11,193,361 B1 | 12/2021 | Yeung et al. | |
| 11,203,924 B2 | 12/2021 | Oehring et al. | |
| 11,208,881 B1 | 12/2021 | Yeung et al. | |
| 11,255,173 B2 | 2/2022 | Coli et al. | |
| 11,261,717 B2 | 3/2022 | Yeung et al. | |
| 11,274,537 B2 | 3/2022 | Yeung et al. | |
| 11,299,971 B2 | 4/2022 | Yeung et al. | |
| 11,319,791 B2 | 5/2022 | Yeung et al. | |
| 11,339,638 B1 | 5/2022 | Yeung et al. | |
| 11,391,137 B2 | 7/2022 | Yeung et al. | |
| 11,396,799 B2 | 7/2022 | Johnson et al. | |
| 11,506,032 B1 | 11/2022 | Fisher | |
| 11,591,888 B2 * | 2/2023 | Yeung | B01F 23/59 |
| 2007/0098580 A1 | 5/2007 | Petersen | |
| 2012/0023973 A1 | 2/2012 | Mayorca | |
| 2014/0096974 A1 * | 4/2014 | Coli | F04B 1/16 166/308.1 |
| 2016/0032703 A1 | 2/2016 | Broussard et al. | |
| 2016/0258267 A1 | 9/2016 | Payne et al. | |
| 2017/0036178 A1 * | 2/2017 | Coli | F04B 1/16 |
| 2018/0258746 A1 | 9/2018 | Broussard et al. | |
| 2019/0003272 A1 | 1/2019 | Morris et al. | |
| 2019/0009232 A1 * | 1/2019 | Yeung | B01F 35/2203 |
| 2019/0112910 A1 | 4/2019 | Oehring et al. | |
| 2019/0226317 A1 | 7/2019 | Payne et al. | |
| 2020/0141219 A1 | 5/2020 | Oehring et al. | |
| 2021/0131410 A1 | 5/2021 | Curry et al. | |
| 2021/0148385 A1 | 5/2021 | Brunty et al. | |
| 2021/0148500 A1 | 5/2021 | Farquharson et al. | |
| 2021/0381929 A1 | 12/2021 | Yeung et al. | |
| 2021/0396116 A1 | 12/2021 | Yeung et al. | |
| 2021/0396222 A1 | 12/2021 | Yeung et al. | |
| 2024/0018859 A1 | 1/2024 | Sun et al. | |
| 2024/0026763 A1 | 1/2024 | Sun et al. | |
| 2024/0026764 A1 | 1/2024 | Sun et al. | |

FOREIGN PATENT DOCUMENTS

| | | |
|---|---|---|
| CN | 202895467 U | 4/2013 |
| CN | 104563994 B | 3/2017 |
| CN | 104563995 B | 9/2017 |
| WO | 8103143 A1 | 11/1981 |
| WO | 2022115511 A1 | 6/2022 |

* cited by examiner

HYDRAULIC FRACTURING BLENDER SYSTEM

CROSS-REFERENCE TO RELATED PATENT APPLICATIONS

This application is a continuation of U.S. Non-Provisional patent application Ser. No. 17/807,658 filed Jun. 17, 2022 and titled "HYDRAULIC FRACTURING BLENDER SYSTEM", which claims the benefit of priority of U.S. Provisional Patent Application No. 63/202,660 filed on Jun. 18, 2021 and titled "MODULAR AND AMBIDEXTROUS HYDRAULIC FRACTURING BLENDER SYSTEM," which is hereby incorporated by reference in its entirety.

TECHNICAL FIELD

The present disclosure relates to systems and methods for preparing fluids used in fracturing operations, and more particularly, to blenders for mixing liquid and solid particles to prepare a fracturing fluid.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracturing fluid is ceased or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

Systems for successfully completing a fracturing operation can be extensive and complex, as shown in FIG. 1, for example. Water from tanks 1 and gelling agents dispensed by a chemical unit 2 are mixed in a hydration unit 3. The discharge from hydration unit 3, along with sand carried on conveyors 4 from sand tanks 5, is fed into a blending unit 6. Blending unit 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11. The chemical unit 2, hydration unit 3 and blending unit 6 may be mounted on a trailer that may be transported by trucks.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

In the event of a failure of a component of the blending unit 6, a need to perform maintenance on a component of the blender, or a need to change a component of the blender, for example due to a change in the job requirements, it becomes necessary to exchange that component for a new component. During this exchanging process, the fracturing operation must be suspended, thereby increasing costs. Also, traditionally many components are located in a fixed position on the blender. For example, traditionally the hopper has been mounted on a hydraulic lift at the rear of the blender. This limits the flexibility of the design of the hydraulic fracturing system. For example, traditionally, the suction side and the discharge side have been limited to be positioned on one of the driver's side and the passenger side.

Typically, hydraulic fracturing blenders utilize a single suction pump, tub, and discharge pump. If one of the components has a failure, the entire blender must be shut down and, in turn, the entire fracturing operation. This may lead to costly downtime and even cause the well to be sanded. This occurs when the operation cannot flush the well and sand is left in the wellbore. If enough sand is left in the wellbore, fracturing operations cannot continue until the sand is flushed out using coiled tubing or a service rig.

A drop in the boost pressure in the pumps also may cause cavitation, which may lead to failures such as fluid end cracking and power failure.

SUMMARY

The present disclosure generally is directed to embodiments of multi-blender systems that include a plurality of independently operable blender units each having components that can operate with either blender unit. Each components may be a modular component mounted on frames or mounts so that modular components of the systems may be exchanged for different modular components to create a customized blender design.

In at least one embodiment, the blender system may be configured to meet operations input parameters. Each major component system of the blender and support equipment may be mounted on the blender unit on independent frames or mounts or on its own independent unit. This makes it possible to easily swap major components in the event of a change in job requirements, mechanical failure, or electronic failure. It also makes it possible to locate major components anywhere on, or near the blender system and configure the blender system in a manner that meets job requirements.

In some embodiments, the multi-blender system includes a first blending unit, a second blending unit, a plurality of crossover lines configured to be in fluid communication with the first and second blending unit; and a controller. In some configurations, the controller is configured to operate the first and second blending units in a first state in which the first blending unit is not in fluid communication with the second blending unit, determine a failure event based on the one or more parameters, and based on the failure event, actuate one or more valves associated with a first crossover line of the plurality of crossover lines to operate the first and second blending units in a second state in which the first blending unit is in fluid communication with the second blending unit. Each blending unit can include a plurality of suction ports, a suction pump configured to draw fluid from the plurality of suction ports, a tub mixer configured to receive fluid from the suction pump and mix the fluid with solid particulates, a discharge pump configured to draw fluid from the tub mixer, and a plurality of discharge ports configured to receive fluid form the discharge pump.

In some embodiments, the crossover lines can include a first crossover line having one or more first valves configured to be positioned in a first state in which the first suction ports are in communication with the first suction pump or a second state in which the first suction ports are in communication with the second suction pump. In some embodiments, the crossover lines can include a second crossover line having one or more second valves configured to be positioned in a first state in which the first suction pump is in communication with the first tub mixer or a second state in which the first suction pump is in communication with the second tub mixer. In some embodiments, the crossover lines can include a third crossover line having one or more third valves configured to be positioned in a first state in which the first tub mixer is in communication with the first discharge pump or a second state in which the first tub mixer is in communication with the second discharge pump. In some embodiments, the crossover lines can include a fourth crossover line having one or more fourth valves configured to be positioned in a first state in which the first discharge pump is in communication with the first discharge ports or a second state in which the first discharge pump is in communication with the second discharge ports.

In some embodiments, a modular blender system is disclosed for blending liquid and solid particulates together to prepare a fracturing fluid. The modular blender system may be located on a mobile platform and include: a first modular blender component system including first frame and a first modular blender component, the first modular blender component being supported on the first frame, and the first modular blender component system being removably mounted to the mobile platform; a second modular blender component system including a second frame and a second modular blender component, the second modular blender component being supported on the second frame, and the second modular blender component system being removably mounted to the mobile platform; and/or a controller configured to monitor operational data representing operational conditions of the first and second modular blender components during a blender operation, detect when the operational data is outside a predetermined range, and configure a replacement modular blender component for the blender operation.

In another embodiment, a method of controlling a hydraulic fracturing blender system comprising first and second blender systems with each blender system comprising a plurality of components is disclosed. The method comprises monitoring operational conditions of the plurality of components of the first and second blender systems, storing operational data representing the operational conditions of the plurality of components of the first and second blender systems, transmitting the operational data to a master blender controller, and switching between using a component of the first blender system in the second blender system when the master blender controller determines that at least one of the operational conditions differs a predetermined amount from an operational requirement.

DETAILED DESCRIPTION

Figure 1:
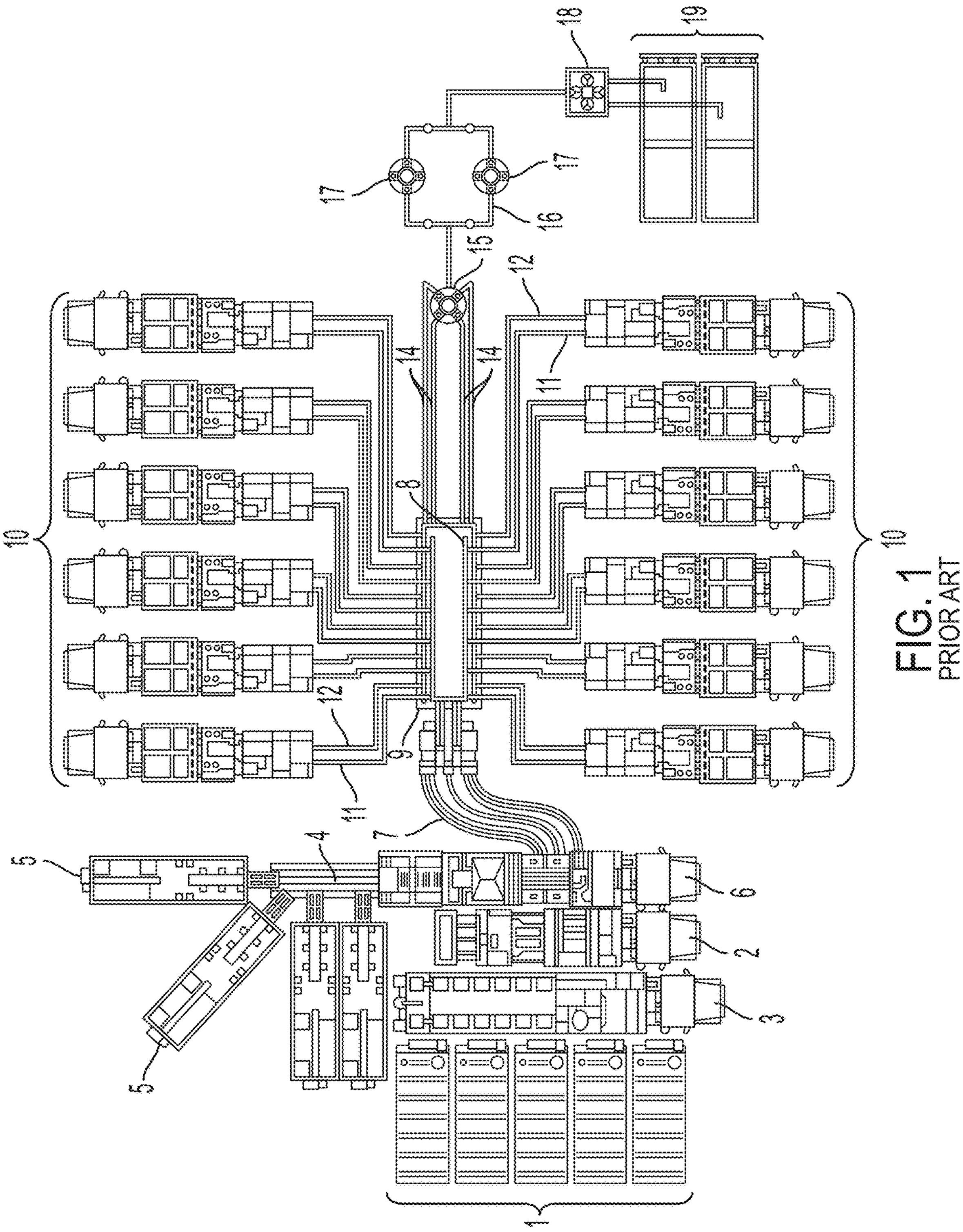
FIG. 1 PRIOR ART
FIG. 1 shows a schematic view of a system for fracturing a well including a conventional blender according to the prior art.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Some embodiments of the present disclosure are directed to modular blender systems that include modular systems mounted on frames or mounts so that modular components of the blender systems may be exchanged for different modular components to create a customized blender design and methods of controlling a hydraulic fracturing blender system. The methods and systems detailed herein may be executed on a controller that provides alerts or alarms to an operator of a potential problem with one or more components of the blender system as well as the presence of cavitation or aeration.

Figure 2A:
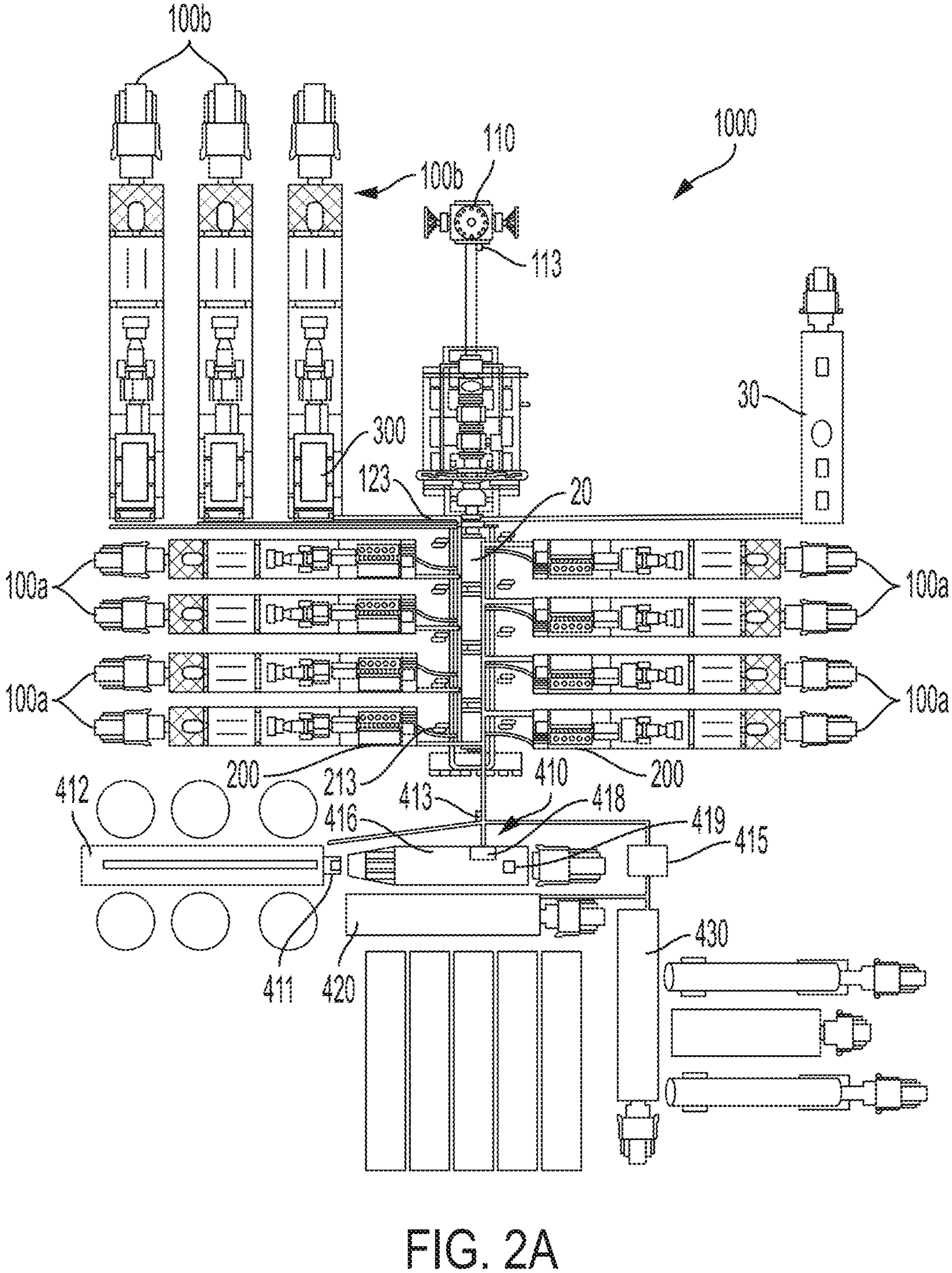
FIG. 2A shows a view of a wellsite hydraulic fracturing system according to an embodiment of the present disclosure.

As shown in FIG. 2A, a blender system 410 supports wellsite hydraulic fracturing pumper system 1000. The wellsite hydraulic fracturing pumper system 1000 includes a plurality of mobile power units 100*a* and 100*b* arranged around a wellhead 110 to supply the wellhead 110 with high-pressure fracturing fluids and recover oil and/or gas from the wellhead 110 as will be understood by those skilled in the art. As shown in FIG. 2, mobile power units 100*a* drive a hydraulic fracturing pumps 200 that discharge high pressure fluid to a manifold 20 such that the high pressure fluid is provided to the wellhead 110. Mobile power units 100*b* drive an electrical generator 300 that provides electrical power to the wellsite hydraulic fracturing pumper system 1000.

In the depicted configuration, the blender system 410 provides a flow of fluid to the fracturing pumps 200 which is pressurized by and discharged from the fracturing pumps 200 into the manifold 20. Water from tanks (not shown) is mixed with gelling agents dispensed by a chemical additive unit 430 in hydration unit 420. The gelled water from the hydration unit 420 is pumped to the mixer/tub 416 by suction pump 415 and mixed with a proppant such as sand in the mixer/tub 416 of blender system 410 to form a slurry. The blender system 410 may include one or more proppant transport system 412, such as screw conveyors, conveyor belts, sand augers, or the like, that provide the proppant to the mixer 416. The blender system 410 also includes a discharge pump 418 that draws fluid from the mixer 416 such that a flow of fluid is provided from the blender system 410 to the fracturing pumps 200.

In one embodiment, the blender system 410 comprises modular systems in which each modular blender component can be positioned and supported on an independent support frame or an adjustable skid system such that the individual modular blender component systems can be easily removed and added to the blender system rather than being fixably mounted directly to a trailer frame. In some embodiments, mixer 416, pump 415, transport system 412, discharge pump 418, or combination thereof, may be configured as a modular system. The modular systems of blender system 410 can be formed on a mobile platform or trailer. Each independent support frame can be connected to the platform or trailer using bolts, linear rails, quick connect systems, or bulkheads. Depending on the hydraulic fracturing job requirements, different type and size of motors, pumps, augers, or conveyor belts, etc. can be used. By using a modular system, the blender system can be configured to meet the requirements while not underutilizing equipment.

As described above, chemical additive pumps (e.g., 409) traditionally are used in a hydraulic fracturing blender. In the modular blender system 410, the number, size, and type of chemical pump 409 can be easily changed in order to meet different operational requirements. In some configurations, pumps 409 may be ground level accessible, may employ easily accessible pump and motor mounts, may employ bulkhead connections, or combination thereof. The electrical motors can be scalable for a wide range of chemical pumps with an adjustable drive shaft to accommodate different pumps.

Figure 2B:
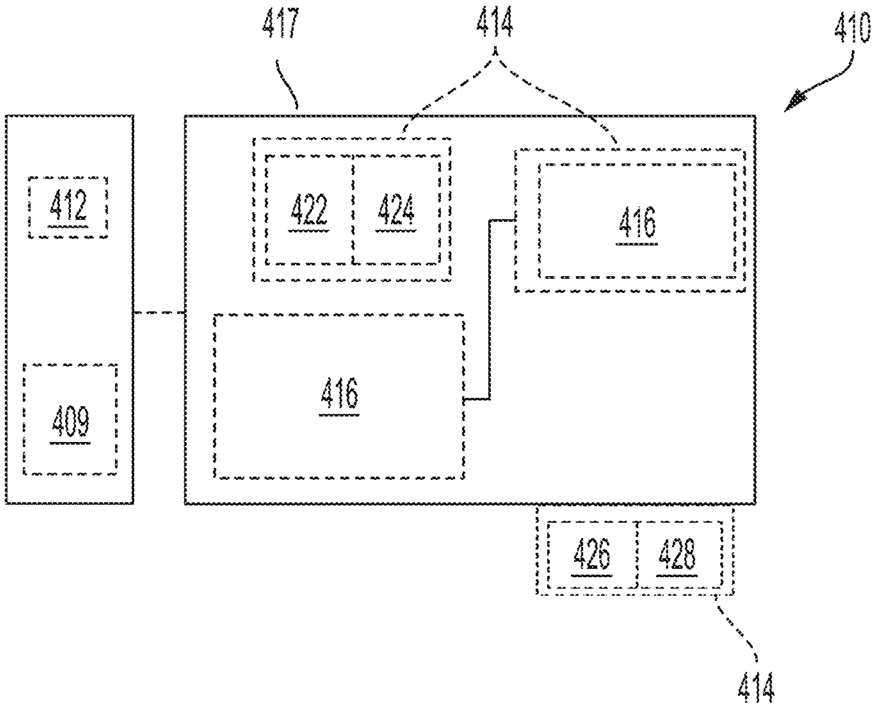
FIG. 2B shows a view of a blending system of the hydraulic fracturing system of FIG. 2A in a first configuration.
Figure 2C:
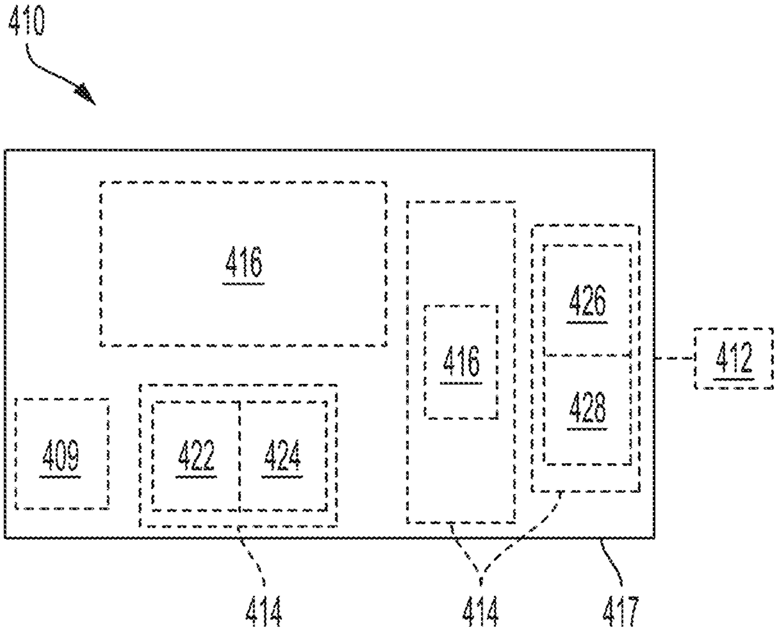
FIG. 2C shows a view of the blending system of the hydraulic fracturing system of FIG. 2A in a second configuration.

As shown in FIGS. 2B and 2C, pumps 422, 426 and motors 424, 428 can be mounted together on the outside of a trailer frame 417 to allow easy access. The pump and motor mounts can be located on an independent support frame 414 that may be equipped with lifting eyelets or slots configured to be engaged by a forklift or other lifting device. In such configurations, support frame 414 can allow an operator to quickly disconnect pumps 422, 426, motors 424, 428, or both, lift it with a lifting device, and install a replacement component (e.g., a similar pump or motor) that is coupled to a replacement support frame (e.g., 414). If the component is not located on the trailer frame 417, it can receive job data or power through a power distribution system it shares with the blender system 410. For quick rig up, the independent components and frames can utilize bulkhead or quick connect couplers to receive hydraulic, electrical, or pneumatic power from the blender system 410. For example, as shown in 2B and 2C, proppant transport system 412, chemical additive pump 409, or other dry additive pumps can be disposed on a different trailer or skid than the trailer 417 upon which the blenders (e.g., 422, 416, 426) are disposed.

To manage alignment for the various major components, each component can utilize an adjustable 3-axis positional mounting. For example, each component can be mounted to a support frame 414 that is adjustable in one, two, or three directions. The individual support frame 414 can include a modular frame(s) that can be mounted on slack adjusters, slotted bolt holes, manual hydraulic lifting devices adjustable drive shafts, and/or other adjustable other coupling systems. In the modular blender design, the proppant transport system 412 can be located on support frame 414 (e.g., a skid with adjustable length and height) or an adjustable trailer frame. This makes it possible to mount the proppant transport system on an adjustable skid that can feed the blender tub 416 on the sides or rear of the trailer frame 417.

Hydraulic fracturing blenders traditionally have a suction side and a discharge side located on one of the passenger side and driver's side. As shown in FIGS. 2B and 2C, in blender system 410 the suction side and the discharge side can be swapped so that the suction and discharge sides can be located on either the passenger or driver side of the trailer to allow for more degrees of freedom for rig up. For example, as shown in FIG. 2B, pump 422 and motor 424 can be placed on a first side of trailer frame 417 in a first configuration and, as shown in FIG. 2B, pump 422 and motor 424 can be placed on a second side of the trailer frame in a second configuration. As an illustrative example, if the job requirements require to have the blender discharge located on the driver's side trailer, a discharge drivers side skid can be mounted on the driver side of the blender, and a passenger side suction skid can be mounted on the passenger side. Although FIGS. 2A and 2B show two tubs 416 and two pumps 422, 426 on trailer frame 417 any number of additional or alternative components can be positioned on the trailer frame. For example, some embodiments can include one or more (e.g., two) blender assemblies placed on trailer frame 417, each blender assembly having a plurality of suction pumps (e.g., 422), a tub (e.g., 416), and a plurality of discharge pumps (e.g., 426). In such configurations, the blender assembly may also include a sand transport system (e.g., 412), one or more chemical additive pumps (e.g., 409), one or more dry additive pumps, or combination thereof. Each component of blender assembly may be placed on an adjustable support frame (e.g., 414) individually, or in combination with one or more other components.

The modular systems of blender system 410 can improve the ease and required time to perform maintenance on blender and allow for increase in flexibility of hydraulic fracturing spread rig up designs. To illustrate, major components that were traditionally in a fixed position can be located anywhere on trailer frame 417 or adjacent to trailer frame 417 (e.g., off the trailer frame). For example, traditionally the hopper is mounted on a hydraulic lift on the rear of trailer frame 417. However, in blender system 410, the hopper (e.g., sand transport system 412) can be located on the rear, front or sides of the blender.

Figure 2D:
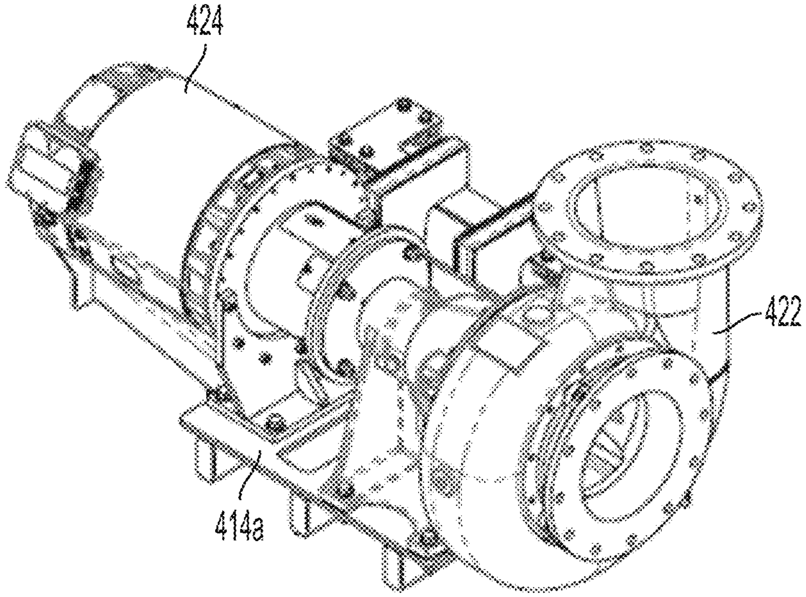
FIGS. 2D and 2E shows perspective views of an example of a first support frame of the present disclosure coupled to a pump and with the pump removed, respectively.
Figure 2E:
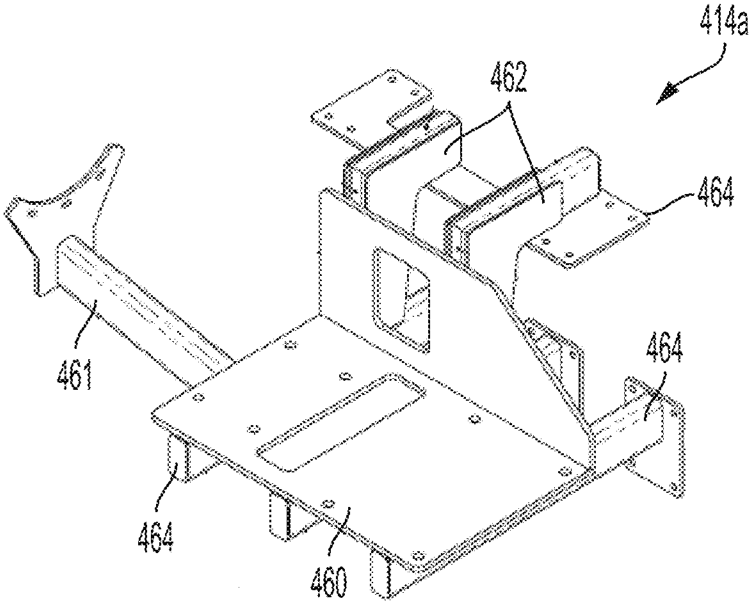

Referring now to FIGS. 2D and 2E, a modular pump unit is shown having pump 422 and motor 426 attached to a first support frame 414*a*. However, in other configurations, other pumps or motors can be coupled to first support frame 414*a*. First support frame 414*a* may be mounted to trailer frame 417 in any suitable manner. For example, first support frame 414*a* can be mounted to a side of the trailer frame and, in some configurations, can hang off a bed or other structure of the trailer frame. As shown in FIG. 2E, first support frame 414*a* includes a mounting frame 460, one or more mounting brackets 462, and one or more support brackets 464 that are configured to be coupled to trailer frame 417. As shown, mounting frame 460 may include an arm 461 extending therefrom to facilitate support of one of the components (e.g., 422, 426). In the depicted configuration, first support frame 414*a* includes four support brackets 464, three of which are configured to be positioned under mounting frame 460 and one of which is configured to be coupled to mounting brackets 462. Mounting brackets 462 can define a channel, or other opening, that is configured to receive a respective portion of a support bracket 464. As shown, mounting brackets 462 can be L-shaped brackets that have one end coupled to mounting frame 460 and a second end that is configured to be disposed on opposing sides of a protrusion (e.g., rail) of support bracket 464. The mounting brackets 462 can be movable (e.g., slidably movable) relative to support bracket 464 to adjust the position of mounting frame 460. First support frame 414*a* can be easily coupled to and removed from trailer frame 417 to replace the pump unit. For example, the entire assembly including mounting frame 460, mounting brackets 462, and support brackets 464 can be removed from trailer frame 417 and replaced with another support frame assembly that is coupled to a pump and motor. Alternatively, mounting frame 460 and mounting brackets 462 can be removed from support brackets 464 which can remain coupled to trailer frame 417 and, in yet other configurations, mounting frame 460 can be removed from mounting brackets 462 which can remain coupled to trailer frame 417. In this way, and others, pump 422 and motor 426 can be easily swapped out with a different pump and motor in the event of failure of one or both components or the need for a differently sized pump and motor configuration.

Figure 2F:
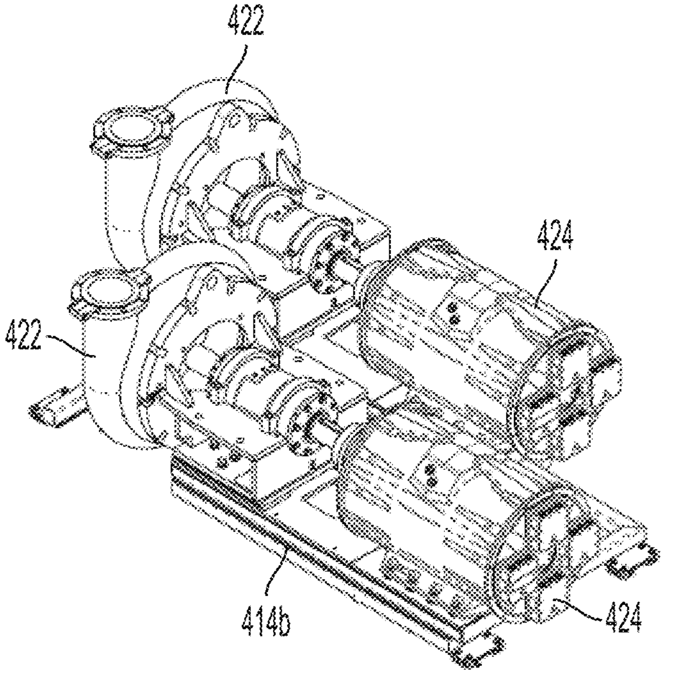
FIG. 2F shows a perspective views of an example of a second support frame of the present disclosure coupled to two pumps.
Figure 2G:
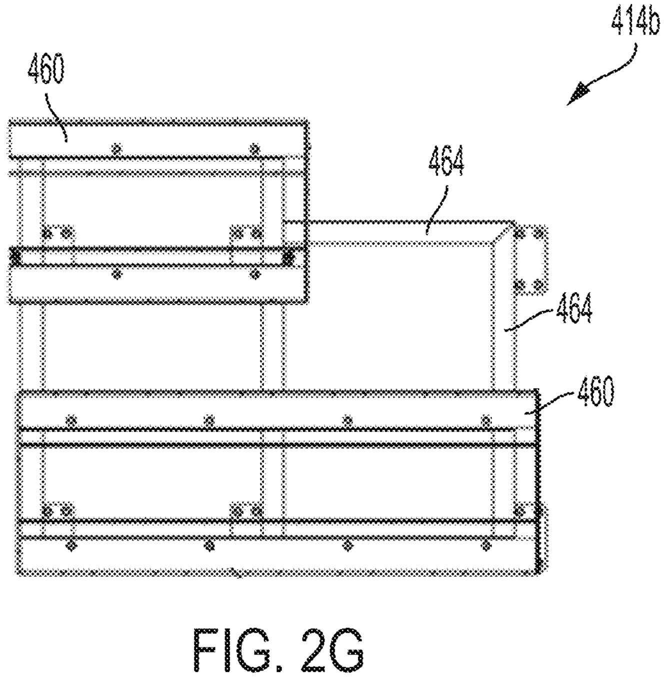
FIG. 2G shows a top views of the second support frame of FIG. 2F without the pumps.

Referring now to FIGS. 2F and 2G, a modular pump unit is shown having two pumps 422 and two motors 426 attached to a second support frame 414*b*. However, in other configurations, other pumps or motors can be coupled to second support frame 414*b*. Second support frame 414*b* may be mounted to trailer frame 417 in any suitable manner. For example, second support frame 414*b* can be mounted to a top surface of the trailer frame. As shown in FIG. 2G, each of a respective pump and motor pair can be coupled to a mounting frame 460 that is configured to be coupled to a support bracket 464 that is mounted on trailer frame 417. The support bracket 464 can include one or more rails or struts on which mounting frame 460 can be connected. Mounting frame 460 can be movable (e.g., slidably movable) relative to support bracket 464 to change the relative position of the pump and motor pair in relation to trailer frame 417. Further, each mounting frame 460 can be removably coupled to the support bracket 464 so that the one of the pump and motor pair can be swapped out with a different pump and motor.

Figure 2H:
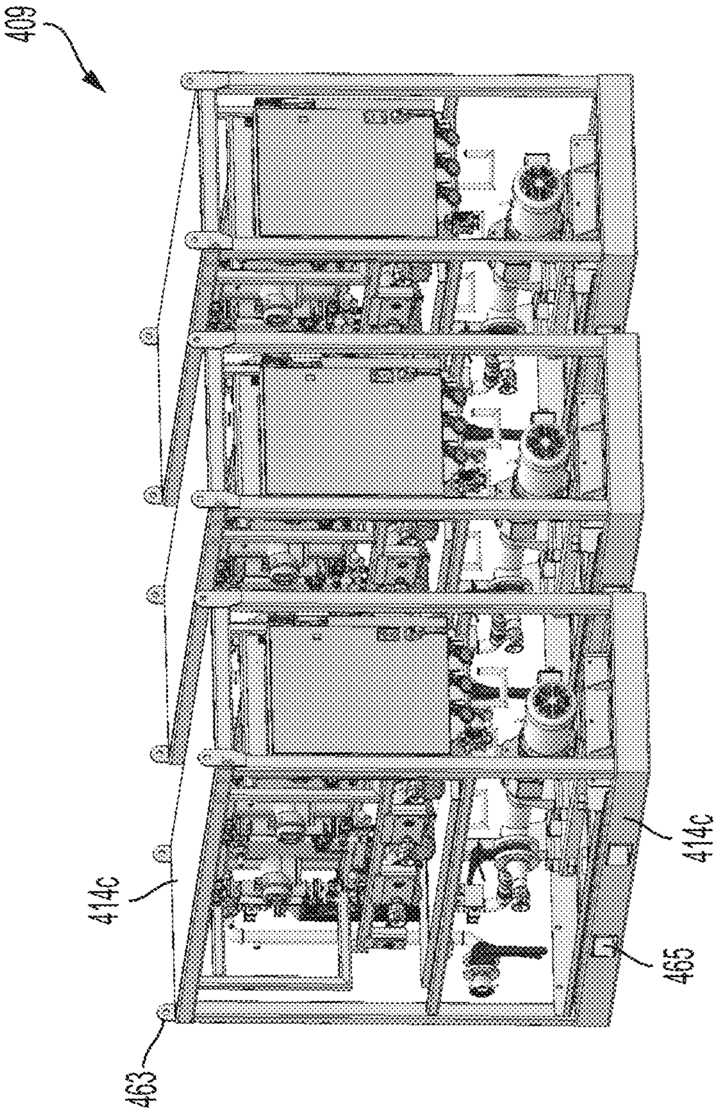
FIG. 2H shows a perspective views of a plurality of chemical additive pump units coupled to an example of a third support frame of the present disclosure.

Referring now to FIG. 2H, an example of three chemical pump units 409 are shown each mounted to a third support frame 414*c*. As shown, third support frame 414*c* can support the plurality of components that may be included in chemical pump units (e.g., 409) and is able to be removably coupled to a trailer frame (e.g., 417) or other skid. In the depicted configuration, third support frame 414*c* can include a plurality of lifting eyelets 463 disposed on a top of the third support frame, a plurality of lifting slots 465 disposed or defined in the bottom of the third support frame, or both. In some configurations, eyelets 463 are configured to be engaged by a first type of lifting device (e.g., crane) and slots 465 are configured to be engaged by a second type of lifting device (e.g., forklift). In this way or others, the third support frame 414*c* can be configured to easily remove major components, that can include a plurality of sub-components, from a trailer frame.

In some configurations, blender system 410 can reduce hydraulic fracturing required space on the pad, thus decreasing pad development costs. To illustrate, repairs that typically require the blender to be rigged out and sent to the shop can be quickly and safely be performed in the field with minimal downtime, thereby decreasing the amount of nonproductive time in operations. Additionally, or alternatively, electrical motor swaps which are typically completed by electricians or electronics technician can instead be performed by equipment operators or mechanics by simply disconnecting the pump and motor skid (e.g., 422, 424) and replacing it with a spare skid. The old skid can then be sent away (e.g., to a repair shop or OEM manufacturer) for repairs without causing the fleet excessive downtime. Typical chemical pumps (e.g., 409) operate in a range of defined minimum and maximum flow rates and discharge pressures. Blender system 410 provides the added flexibility to efficiently swap out chemical pumps depending on various operational parameters, which allows operations to meet constantly changing job design requirements. In some embodiments, blender system 410 can improve the alignment of components such as discharge plumbing or pump/motor alignment, which can reduce potential failures such as leaks or increased vibration In some embodiments, the modular blender system 410 can reduce the amount of hard mounting points that can preload blender plumbing causing leaks or erosion. Also, blender system 410 makes major components more accessible by mechanics and operators for ease of troubleshooting and maintenance, which removes potential hazards such as pinch points and prevents mechanics having to put themselves dangerous situations. The ambidextrous design that is possible with the modular design of blender system 410 can remove the need for driver overs or running hoses underneath blender to swap suction and discharge sides. Mechanics can use the given tools to align components rather than having to work on equipment that is suspended in the air or with a preload.

Referring back to FIG. 2A, the wellsite hydraulic fracturing pumper system 1000 includes a supervisory control unit that monitors and controls operation of the mobile power units 100*a* driving the fracturing pumps 200, the mobile power units 100*b* driving electrical generators 300, and other units (e.g., 410, 420, 430) and may be referred to generally as controller 30. The controller 30 may be a mobile control unit in the form of a trailer or a van, as appreciated by those skilled in the art. As used herein, the term "fracturing pump" may be used to refer to one or more of the hydraulic fracturing pumps 200 of the hydraulic fracturing pumper system 1000. In some embodiments, all of the hydraulic fracturing pumps 200 are controlled by the controller 30 such that to an operator of the controller 30, the hydraulic fracturing pumps 200 are controlled as a single pump or pumping system. Further details regarding the supervisory control unit are disclosed in U.S. application Ser. No. 17/182,408 filed on Feb. 23, 2021, and U.S. application Ser. No. 17/189,397 filed on Mar. 2, 2021, which are hereby incorporated by reference in their entireties.

Figure 3:
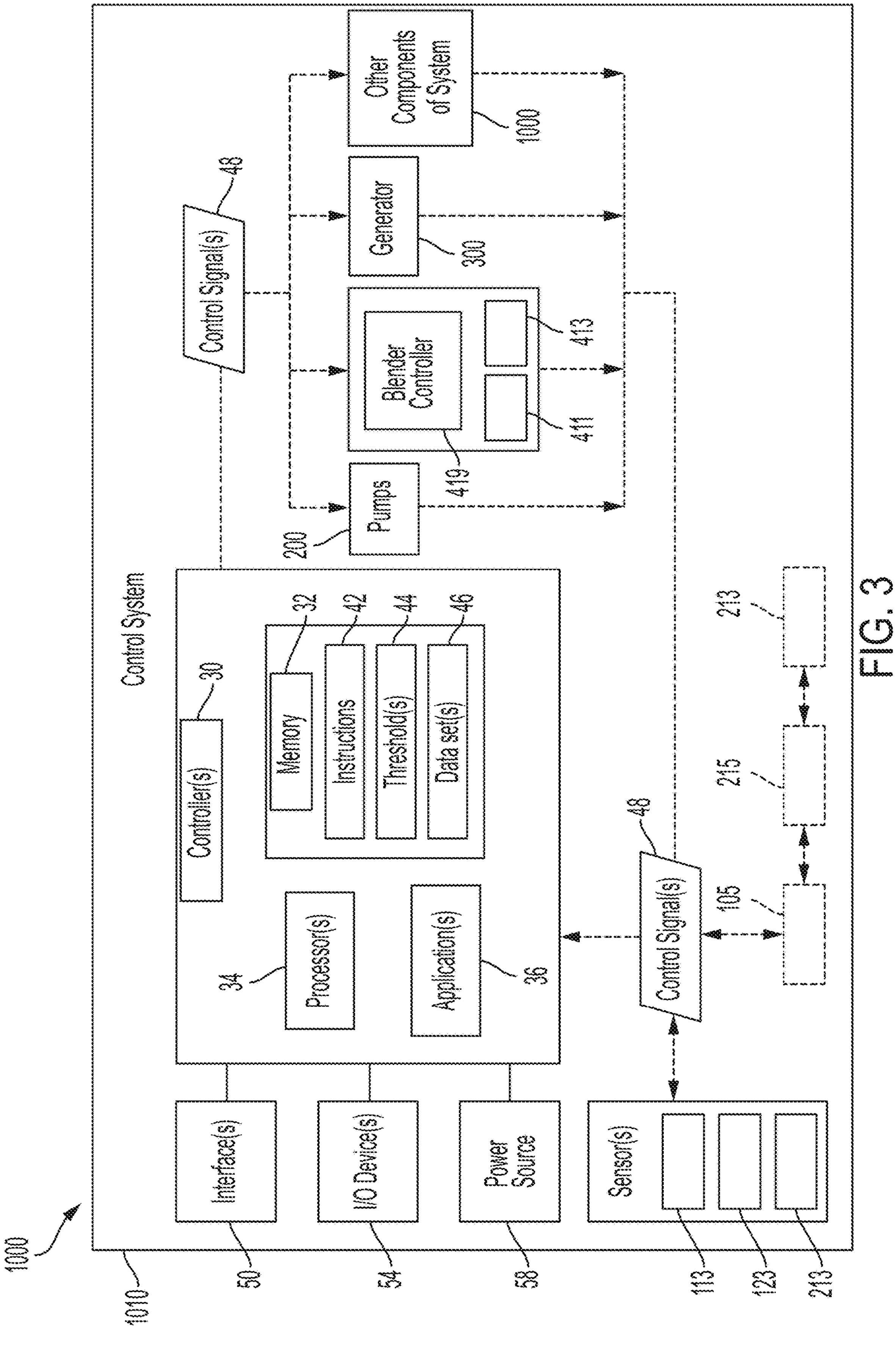
FIG. 3 shows a schematic view of a control system of the wellsite hydraulic fracturing system of FIG. 2A.

FIG. 3 illustrates a schematic of a control system for the wellsite hydraulic fracturing pumper system 1000 referred to generally as a control system 1010. As depicted, control system 1010 can include controller 30 which is configured to control one or more operations of system 1000, such as, but not limited to, operation of the flow of fluid and other materials through blender system 410 (412, 416, 418, 415), operation of inlets or outlets, monitoring of flow parameters, fluid compositions, or the like (e.g., via sensors or other controllers), or combination thereof. In the depicted configuration, control system 1010 may comprise one or more interface(s) 50, one or more I/O device(s) 54, and a power source 58 coupled to controller 30. System 1000 can include one or more sensor(s) configured to detect one or more parameters and to provide data to controller 30 (e.g., via control signal 48). Each component of control system 1010 can be in signal communication with one or more other components of the control system, which can be a wired connection or a wireless connection. In some configurations, circuitry (e.g., a PCB, wires, etc.) may connect components of control system 1010 with one or more other components of system 1000. Additionally, or alternatively, components of control system 1010 may be in wireless communication with one or more other components of system 1000 such as, for example, via be Wi-Fi®, Bluetooth®, ZigBee, or forms of near field communications. In some configurations, components may be in signal communication via one or more intermediate controllers or relays that are in signal communication with one another. For example, a pump output pressure transducer 213 may be in direct electrical communication with a pump controller 215 and the pump controller may be in direct electrical communication with a controller 105 of the mobile power unit 100*a* which is in communication with the controller 30.

Controller 30 may include a processor 34 coupled to a memory 32 (e.g., a computer-readable storage device). In some configurations, controller 30 may include one or more application(s) 36 that access processor 34 and/or memory 32 to perform one or more operations of system 1000. Processor 34 may include or correspond to a microcontroller/microprocessor, a central processing unit (CPU), a field-programmable gate array (FPGA) device, an application-specific integrated circuits (ASIC), another hardware device, a firmware device, or any combination thereof. Memory 32, such as a non-transitory computer-readable storage medium, may include volatile memory devices (e.g., random access memory (RAM) devices), nonvolatile memory devices (e.g., read only memory (ROM) devices, programmable read-only memory, and flash memory), or both. Memory 32 may be configured to store instructions 42, one or more thresholds 44, one or more data sets 46, or combination thereof. In some configurations, instructions 42 (e.g., control logic) may be configured to, when executed by the one or more processors 34, cause the processor(s) to perform one or more operations (e.g., actuate valves on inputs and outputs of the vessels). The one or more thresholds 44 and one or more data sets 46 may be configured to cause the processor(s) to generate control signals (e.g., 48). For example, the processor(s) 34 may initiate and/or perform operations as described herein. As a specific example, thresholds can include a volume level of a tub, a concentration of a material (e.g., sand, chemical, additive, or the like) within the fluid, a time, a pressure, a temperature, a flow rate, or other fluid parameter within the system, pump rpm (e.g., maximum or minimum allowable rotational rate), prime mover rpm, screen out threshold, or other thresholds. Data sets 46 can include data associated with thresholds or other parameters of system 1000, such as, operational data, maintenance data, equipment set up, equipment alarm history, prime mover information, equipment health ratings, or the like, as described in more detail with respect to FIG. 6.

Application(s) 36 may communicate (e.g., send and/or receive) with processor 34 and memory 32. For example, application(s) 36 may receive data from sensor(s) or memory 32 (e.g., data sets 46), manipulate or organize the data, and send a signal to processor 34 to cause the processor to output the data (e.g., via interface 50 or I/O device 54) or store the data (e.g., via memory 32). In some configurations, application(s) 36 comprises COMSOL, ABAQUS, ImageJ, Matlab, Solidworks, AutoCAD, ANSYS, LabView, CATIA, OpenFoam, HFSS, Mathcad, combination thereof, or the like. In some configurations, controller 30 is configured to generate and send control signals 48. For example, controller 30 may generate and/or send control signals 38 responsive to receiving a signal and/or one or more user inputs via the one or more interfaces 50 and/or the one or more I/O devices 54. Additionally, or alternatively, controller may generate and/or send control signals 38 responsive to one or more of instructions 42, thresholds 44, or data sets 46, or receiving a control signal from one or more components of system 1000, such as, pumps 200, blender controller 419, generator 300, sensors, or other components (e.g., 105).

Interfaces 50 may include a network interface and/or a device interface configured to be communicatively coupled to one or more other devices. For example, interfaces 50 may include a transmitter, a receiver, or a combination thereof (e.g., a transceiver), and may enable wired communication, wireless communication, or a combination thereof, such as with I/O device 54. The I/O device(s) 54 may include a touchscreen, a display device, a light emitting diode (LED), a speaker, a microphone, a camera, keyboard, computer mouse, another I/O device, or any combination thereof, as illustrative, non-limiting examples. In some configurations, interfaces(s) 50 and/or I/O device(s) 54 may enable a wired connection to controller 100 via a port or other suitable configuration.

Power source 58 may be coupled to controller 30, interface(s) 50, I/O device(s) 54, or combination thereof. In some configurations, power source 58 may be coupled to components of control system 1010 via circuitry. In some configurations, power source 58 may include a battery, generator, electrical grid, or the like. Although system 10 has been described as including interface(s) 104, I/O device(s) 108, and power source 112, in other configurations, the system may not include one or more of the interface(s), I/O device(s), or power source.

The controller 30 may be in signal communication with the blender system 410 to control the delivery of the proppant to the mixer 416, a flow rate of fluid from the suction pump 415 (e.g., 422) to the mixer/tub 416 and a flow rate of fluid from the discharge pump 418 (e.g., 426) to the fracturing pumps 200. In some embodiments, the controller 30 may be in signal communication with the fracturing pumps 200 to control a discharge rate of fluid from the fracturing pumps 200 into the manifold 20. In addition, the controller 30 may be in signal communication with one or more sensors of the wellsite hydraulic fracturing pumper system 1000 to receive measurements or data with respect to the fracturing operation. For example, the controller 30 can receive a measurement of pressure of the fluid being delivered to the wellhead 110 from a wellhead pressure transducer 113, a manifold pressure transducer 123, or a pump output pressure transducer 213. The wellhead pressure transducer 113 can be disposed at the wellhead 110 to measure a pressure of the fluid at the wellhead 110. The manifold pressure transducer 123 is shown at an end of the manifold 20. However, as understood by those skilled in the art, the pressure within the manifold 20 is substantially the same throughout the entire manifold 20 such that the manifold pressure transducer 123 may be disposed anywhere within the manifold 20 to provide a pressure of the fluid being delivered to the wellhead 110. The pump output pressure transducer 213 can be disposed adjacent an output of one of the fracturing pumps 200 which is in fluid communication with the manifold 20 and thus, the fluid at the output of the fracturing pumps 200 is at substantially the same pressure as the fluid in the manifold 20 and the fluid being provided to the wellhead 110. Each of the fracturing pumps 200 may include a pump output pressure transducer 213 and the controller 30 may calculate the fluid pressure provided to the wellhead 110 as an average of the fluid pressure measured by each of the pump output pressure transducers 213. In some configurations, controller 30 may be in signal communication with one or more other sensors such as tub level sensors, pressure sensors, magnetic pickups, power draw sensors, or the like.

The pump output transducer 213 may be in communication with a pump controller 215 which may be in communication with a mobile power unit controller 105 which may be in communication with the controller 30 such that the pump output transducer 213 is in signal communication with the controller 30. In some embodiments, the pump output transducer 213 is in signal communication with the controller 30. The pump controller 215 is configured to control the fracturing pump 200 in response to commands signals provided by the controller 30 or the mobile power unit controller 30. The pump controller 215 may include a pump profiler that records events experienced by the fracturing pump 200. The recorded events may be used to schedule maintenance of the fracturing pump 200.

In some embodiments, the controller 30 may be in signal communication with sensors disposed about the blender system 410. For example, the blender system 410 may include a blender controller 419 that is configured to perform one or more operations or transmit one or more signals with respect to the components of blender system 410. In some configurations, blender controller 419 can include or be in communication with a blender flow meter 413, a blender screw encoder/pickup 411, or the like. The blender flow meter 413 and the blender screw encoder/pickup 411 may be in communication with the blender controller 419 which may be in communication with the controller 30. Blender screw encoder/pickup 411 is configured to provide a rotation rate of the proppant transport system 412 (e.g., screw conveyors) of the blender system 410 which provides proppant to the mixer 416. When the proppant transport system 412 are not active or rotating, proppant is not being added to the mixer 416 and proppant is not being provided to the fracturing pumps 200. In some embodiments, blender system 410 may include a blender flow meter 413 that is configured to measure a flow of fluid from the mixer 416 to the fracturing pumps 200.

In some configurations, instructions 42 (e.g., control logic) may be configured to, when executed by the one or more processors 34, cause the processor(s) to perform one or more operations. For example, the one or more operations may include receiving a message (e.g., control signal 48, a command, or an instruction) to perform an operation and identifying the requested operation. To illustrate, the operation may include controlling the flow of fluid, additives, or mixed fluid in multi-blender system 410. For example, one or more operations may include actuating one or more valves, such as a crossover valve, to transmit the fluid between two blending units, adjusting (e.g., reducing or stopping) a speed of a first pump of a first blending unit, and adjusting (e.g., increasing) the speed of a second pump of a second blending unit. In some configurations, instructions 42 may be configured to transfer control of a system from a first processor (e.g., 34) to a second processor (e.g., 34) or from a first controller (e.g., 30) to a second controller (e.g., 30). For example, instructions (e.g., 42), can be configured to cause a first controller to transmit data stored in a first memory, such as instructions, thresholds, data sets, or the like, to a second controller to the second controller may seamlessly continue operation of one or more components in the same manner as the first controller. Such an operation can provide redundancy in control system 1010.

The one or more operations may also include transmitting or receiving one or more signals 48 to one or more other components, such as one or more pumps 200 or local pump controller 215, generator 300 or controller thereof, mobile power units 100*a*, 100*b*, or power unit controller 105. In some configurations, operations can include receiving data such as pump information, operational data, maintenance data, equipment set up, equipment alarm history, prime mover information and equipment health ratings.

The controller 30 can manage the modular blender components and ensure that the blending operation is performed properly. As discussed in more detail below, each modular blender component (e.g., mixer 416, chemical additive pump 409, pump 415, transport system 412, discharge pump 418, pump 422, pump 426, motor 424, motor 428, dry additive units, or the like) can comprise a local controller that stores data related to that blender component, such as operational data, maintenance data, equipment configuration data, alarm history, equipment health data, etc. This data can be sent to a blender controller (e.g., 419, 500, 535, 540) that can review this data to determine whether a modular blender component should be replaced. Some or all of this data can be shared with the replacement modular blender component so that the replacement blender component can be configured to meet the current job requirements. This will allow the replacement modular blender component to quickly become operational using the same parameters as the modular blender component it is replacing, thereby ensuring that the blender operations can continue operating in the same manner as before the replacement of the modular blender component.

Figure 4A:
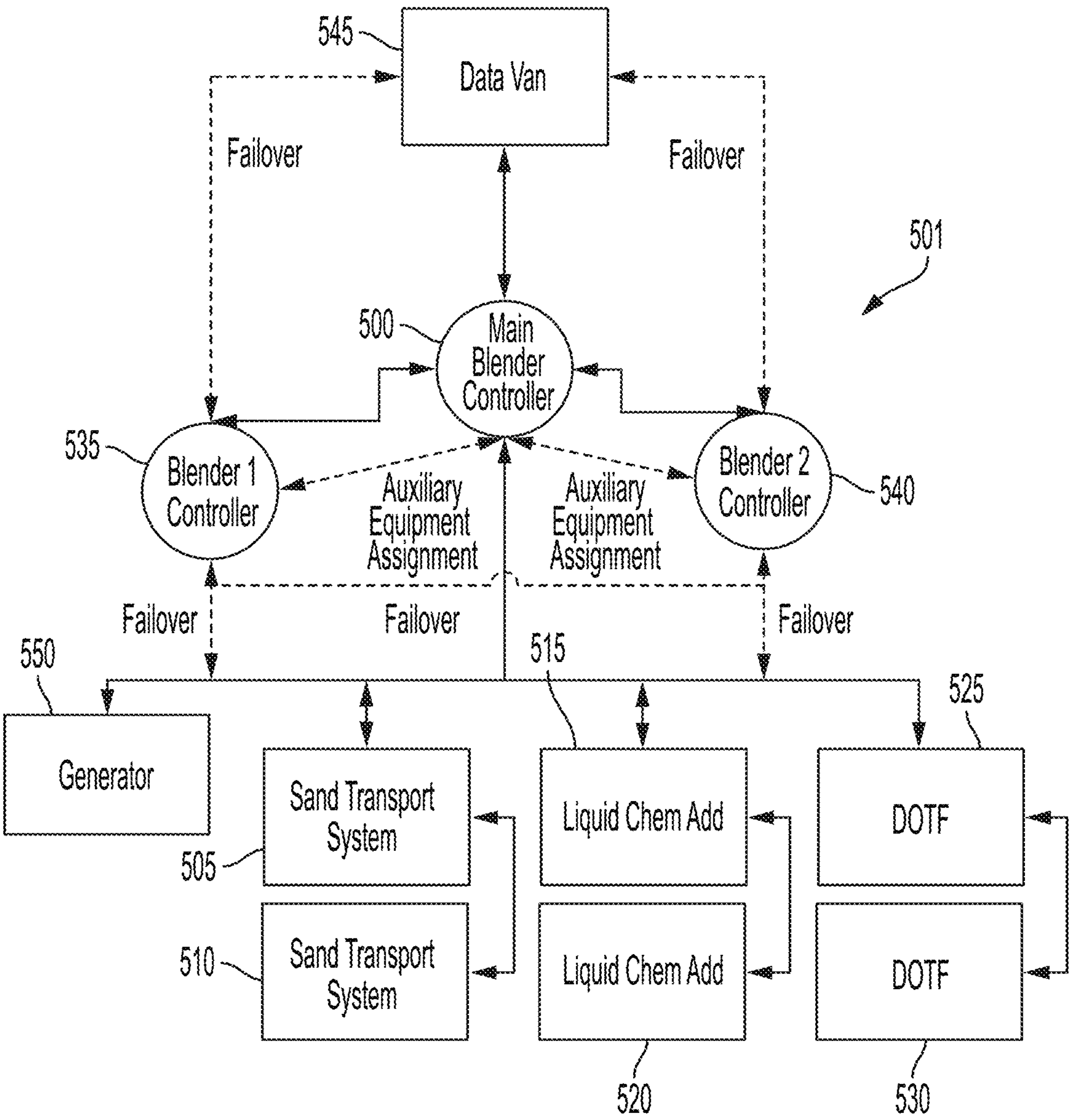
FIG. 4A shows a blender control system in a first configuration having a main blender controller according to an embodiment of the present disclosure.
Figure 4B:
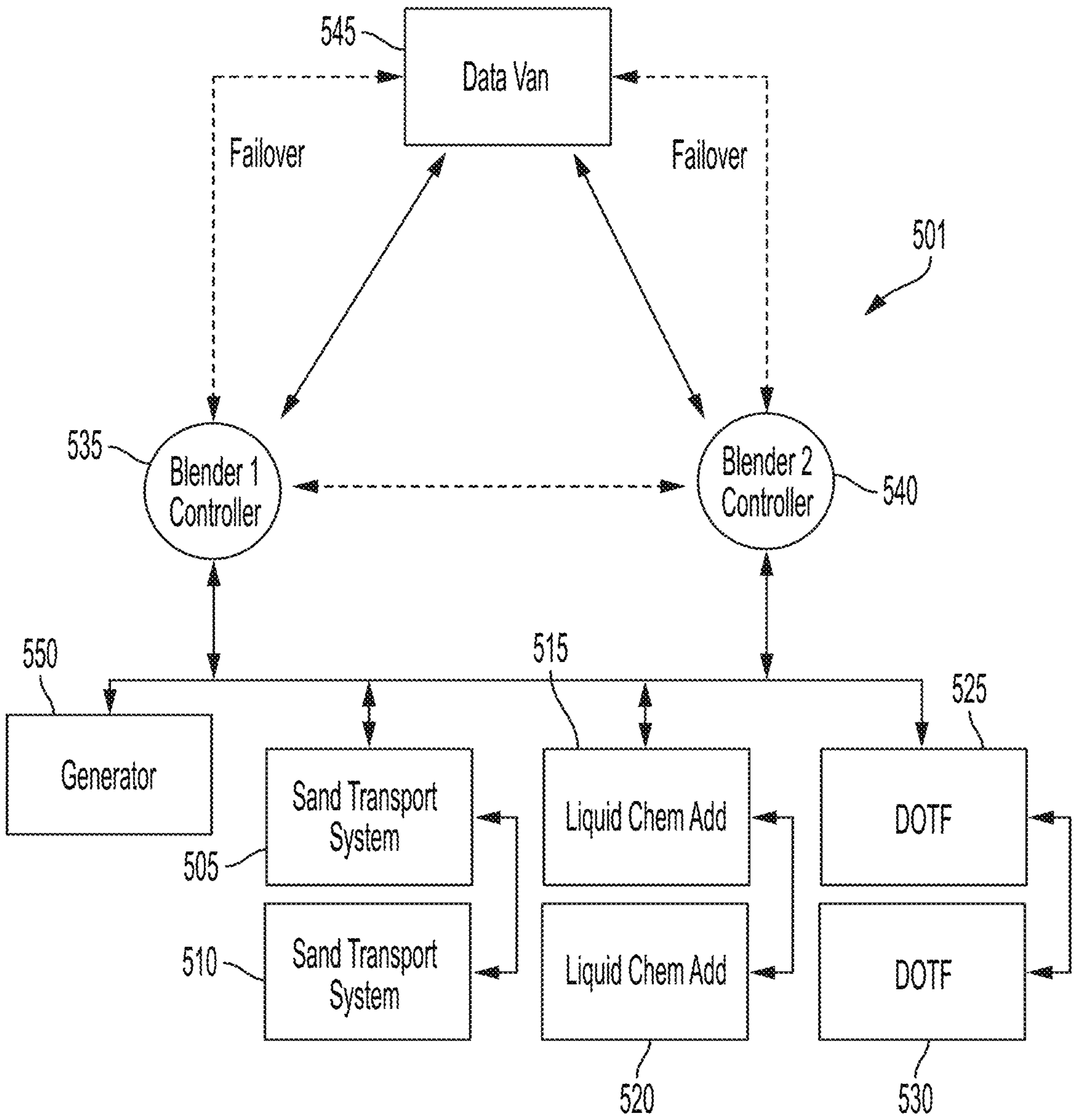
FIG. 4B shows the blender control system in a second configuration having two sub-controllers according to an embodiment of the present disclosure
Figure 5:
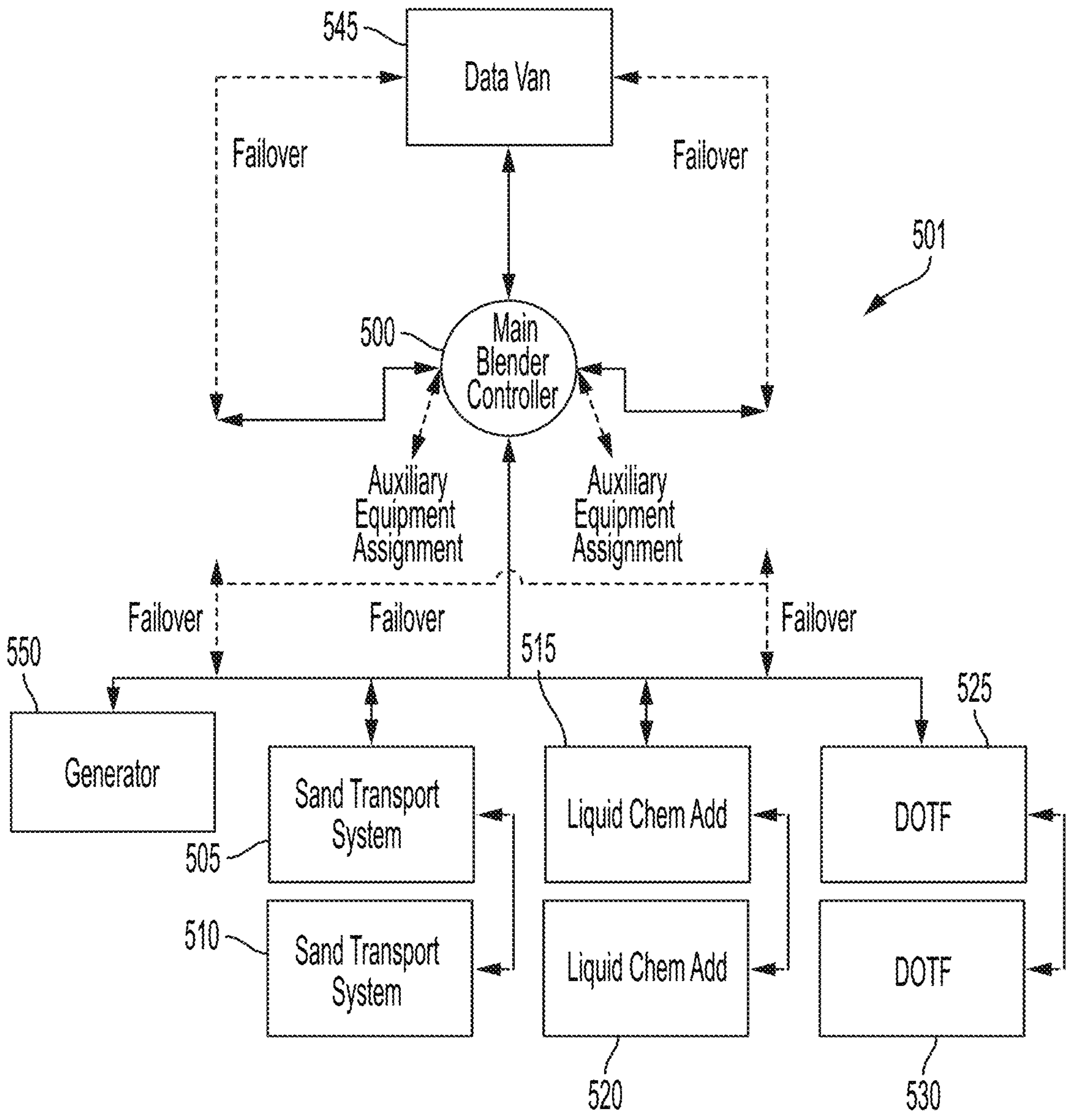
FIG. 5 shows another blender control system comprising a main blender controller according to an embodiment of the present disclosure.

Referring now to FIGS. 4-5, a schematic diagram of a blender control system 501 is shown. Blender control system 501 may include or correspond to blender controller 419 or one or more components thereof and, in some configurations, blender control system 501 is configured to perform, individually or in conjunction with one or more other controllers (e.g., 30), one or more operations for a hydraulic fracturing system, such as wellsite hydraulic fracturing pumper system 1000. Blender control system 501 is configured to operate a multi-blender system (e.g., 410) having automatic multi-redundancy controls. The multi-blender system can include multiple blender systems each having independent suction pumps, tubs, discharge pumps, and dry and chemical additive units. In some configurations, such as that disclosed in FIGS. 9A-9E, the multi-blender system can include two independent blenders on the same trailer (e.g., 417), with plumbing and mechanically actuated valves to support crossing over of fluids from the two sides of the blender. Each suction pump (e.g., 422) may feed its own blender tub (e.g., 416) which may then feed a single discharge pump (e.g., 426) or multiple discharge pumps at the same time. In this way, and others, the dual redundancy of blender control system 501 enable a great deal of flexibility for operation of the blender.

The multiple blenders can be treated as independent separate blender systems controlled by a single blender control system (e.g., main controller 500, Blender 1 controller 535, Blender 2 controller 540, or combination thereof). In such configurations, each blender may continue to operate in the event the other blender system fails, without interrupting operations. In some configurations, such as that shown in FIG. 4A, the multiple blender components are controlled through a master blender controller 500 that is configured to receive job data from an external source such as a datavan 545. The master blender controller 500 may send this data through standard communication protocols to multiple sub control systems based on programmable logic controller (PLC) pre-programmed control logic. For example, controller 500 may be in communication with sub-controller 535, sub-controller 540, or both. In some configurations, the individual independent control systems (e.g., 535, 540) may then take the received data and adjust its operation based on PLC pre-programmed control logic (e.g., 42, 44, 46). The output from the sub-controllers 535, 540 or other components of the subsystem is sent back to the master controller as a feedback loop.

The two-blender system can be operated either independent of one another or in conjunction. In such configurations, it possible to run two different sand concentrations on the same blender at any given time. For example, while a first blender is running a certain concentration of sand, a second blender could be run without sand, such as a water mixed with a chemical. To further illustrate, ff the well pressure begins to rise while on sand and a potential for a well screen out is high (e.g., above a screen out threshold), the first blender can either automatically or manually be swapped out with the second blender running fresh water based on signals from control system 501. In some such configurations, a tub agitator in the initial tub can then be sped up to prevent sand from settling out in the tub associated with the first blender where fluid is no longer being pulled.

Blender control system 501 may include various independent subsystems such as first and second sand transport systems 505 and 510, first and second liquid chemical additive systems 515 and 520, first and second dry-on-the-fly (DOTF) hydration units 525 and 530, or combination thereof. The DOTF hydration units 525 and 530 may be configured to mix and hydrate different types of dry polymers for continuous-mix hydraulic fracturing operations to provide the necessary mixing shear and hydration tank volume to ensure complete hydration of the polymer before delivery to the multi-blender system.

As shown in FIG. 4A, the master blender controller 500 receives data from the various blender subsystems through standard communication protocols and comprises a programmable logic controller (PLC) that communicates with sub-controllers based on pre-programmed logic. The master blender controller 500 uses data from multiple sensors from components and systems throughout the blender system (e.g., 410) to control the different systems and components of the blender and to provide warnings to the operator of any possible issues to thereby improve the performance of the blender operations. In some configurations, based on a problem with one of these subsystems, the master controller (e.g., 500) can switch to a redundant subsystem (e.g., 535). Before doing so, the settings of the redundant subsystem that is being activated can be updated to reflect the current settings of the subsystem that is being replaced so the blender operations can continue in the same manner with the redundant subsystem.

The sub-controllers 535, 540 are configured to control an individual blender system based on pre-programmed logic. The master blender controller 500 may be configured to assign a modular local controller to each blender system as the sub-controller for that blender system. FIG. 4A depicts an illustrative example that includes sub-controller 535 for Blender #1 and sub-controller 540 for Blender #2. In other configurations, additional blenders having additional controllers could be included in the blender system. The master blender controller 500 may be configured to receive and transmit job data to the sub-controllers 535, 540 for blending operations. In some configurations, sub-controllers 535, 540 can include independent PLC's that receive data from a main computer (not shown), perform calculations, and adjust their operation based on local PLC commands. The output from these commands can be transmitted back to the master blender controller 500 and may act as a feedback loop. Master blender controller 500, sub-controllers 535, 540, or both may be configured to send data to the external datavan 545. For example, if one of the blenders (e.g., blender 2 controller 535) has a problem, the master blender controller 500 can perform the work of the blender controller (e.g., blender 2 controller 535). Additionally, or alternatively, if the master controller 500 has a problem, such as a burnout, then sub-controllers 535, 540 may control the blending systems or the operator can control the sub-controllers individually. In some configurations, master blender controller 500, sub-controllers 535, 540, or both, may store and re-assign the ID's for each sub-controller so that the controller or blender system can be replaced with a system with the existing ID. In this way, and others, blender control system 501 allows for electronic control redundancy which can significantly reduce downtime.

Blender control system 501 may be configured to detect mechanical or electrical issues in the system. For example, the multi-blender system (e.g., 410) can monitor operational or performance data for each component on both blenders. Using various instrumentation devices such as tub level sensors, pressure sensors, magnetic pickups, power draw sensors, etc., the system 501 can detect potential issues much faster than human intervention to maintain job integrity. For example, a tub (e.g., 416) can include three (3) tub level sensors to monitor the tub level. All three (3) sensors should be somewhat equal. However, if it is determined that the reading of one tub level sensor deviates from the other two, then the other two sensors can be used to compute the tub level and a warning for the tub level with the different value can be sent. The system 501 can be capable of much faster sampling frequency and less control latency so that it can respond faster than human intervention in order to prevent boost pressure from dropping, thereby preventing cavitation in the hydraulic fracturing pumps and avoiding sanding off of the well and switching down of the operations. Accordingly, the system 501 can be configured to adjust one or more components or operations of the blender system (e.g., 410) to maintain job integrity without interruption.

In configurations in which the blender is using a single tub (e.g., 416), but utilizing both blender discharge pumps, the system 501 can monitor the discharge pumps for several parameters to determine potential failures. As an illustrative example, in the event a first blender discharge pump (e.g., 426, 418) is not meeting operational requirements, system 501 may adjust a second blender discharge pump (e.g., 426, 418) to increase its speed or completely take over discharge from the tub. This determination may be based on multiple data channels, transducers, sensors, thresholds, or other data or instructions in the system. In some configurations, system 501 may be configured to maintain a boost pressure as measured by the transducer coming from the first and second blender. System 501 may be configured such that each blender discharge pump can have their own independent discharge pressure. For example, system 501 and associated controllers can actuate values, such as isolation valves or check valves to control discharge pressure for the blenders. In some configurations, if the boot pressure drops below a defined value (e.g., pressure threshold), the system 501 can be configured to switch discharge pumps in a gradual or instantaneous manner. For example, if the first pump is operating at a maximum allowable rotational rate (e.g., 1,400 RPM) and a desired pressure is not achieved (e.g., 90 psi), the controller (e.g., 500, 535, 540, 30) can switch to a second pump. In some configurations, the speed for switching between pumps can be based on a difference between the actual or measured boost pressure and the desired boost pressure. Additionally, or alternatively, a health or life of a pump can be utilized to determine when or how quickly operations, such as switching pumps, can occur. In some configurations, the operational/expected life of a pump can be determined by monitoring operational parameters. For example, if the rotational speed of the pump exceeds a certain percentage (e.g., 80%) of a maximum rotational speed (e.g., 1,400 RPM), and the total flow is below a certain level, then system 501 can determine that there is an is a problem with the pump (e.g., based on the speed being over a threshold speed). In a specific non-limiting example, plot total flow vs. average rotational rate, actual RPM vs. maximum RPM, average cavitation rate per certain volume (e.g., 1000 barrels), or other data can be combined together and plotted. System 501 may determine the operational/expected life of a pump using such a plot (e.g., 1$^{st}$ Point (pressure), 2$^{nd}$ Point (how far we are compared to the max RPM), and 3$^{rd}$ Point (what is average cavitation rate per 1000 barrels)), which can project and map out the projected life of pump (barrels). In other configurations, any combination or subset of this data, or additional data, could be used by system 501 to determine the projected life of a pump.

In some configurations, the suction pump operation can be based on a tub level. For example, during blending operation, if the suction pump (e.g., 422, 415) cannot maintain tub level, a controller (e.g., 500, 535, 540, 30) can be configured to gradually or instantly switch the suction pumps and tubs. The speed of this switching may be dependent on a difference between a measured tub level (e.g., from a tub level sensor) and the required tub level. To illustrate, control system 501 can automatically or independently actuate valves, control pump RPMs, or the like, to maintain a target tub level and discharge boost pressure. The control system 501 can also automatically or independently control operation of sand transport system 505, 510 (e.g., the blender auger rpm, proppant concentration of the fracturing pump slurry, or the like) based on the system operation state. Additionally, or alternatively, control system 501 can use external hydraulic fracturing data to control and moderate multiple blender systems to prevent well screen outs and pressure outs.

In configurations in which the blender is only utilizing a single side of the blender (e.g., only using one suction pump, tub, discharge pump, etc.), the system 501 may be configured to monitor multiple sensors of the blender to detect any interruptions in operation. For example, the system 501 can monitor local pump output pressure transducers, input pump transducers, pump speeds, tub level sensors, motor power draw, flow rates, or other measurements to determine when the tub level and/or boost pressure exceeds a pre-set threshold over a set period of time. Based on exceeding the threshold, system 501 may determine the presence of a mechanical or electrical failure and perform one or more operations (e.g., initiation of alert, adjustment of RPM. The system 501 can be configured to monitor wellhead pressure transducers, blender boost pressure on the multiple blenders (blenders 1, 2, 3, etc.), blender discharge pump suction pressure, blender suction pump boost pressure, blender suction pump head pressure, sand input rate, pump RPM on the multiple blenders (blenders 1, 2, 3, etc.), discharge and suction pump power draw (AMPs, engine load etc.), suction and discharge rate via magnetic flow meters, and valve position feedback. In some such configurations, the non-operational blender side can remain in a stand-by state that allows it to quickly begin or take over operation. To illustrate, based on detection of an operational issue of a first discharge pump, system 501 may actuate a crossover valve to open, and operate a second discharge pump to make up the required boost pressure. Additionally, or alternatively, based on detection of an operational issue of a first suction pump, system 501 may operate the blender system to switch suction pumps and tubs, either flushing the well, or if multiple sand transport systems are available, continue blending operations. In a non-limiting example, if a sensor at a pump indicates that a certain volume is being pumped (e.g., 100 barrels per minute), but a downstream flowmeter indicates a different pumping rate (e.g., 90 barrels per minute), then system 501 can determine that there may be a valve leak in a downstream pump, a flow meter problem or a frozen valve. In another example, if a pump indicates that the boost pressure is 70 psi, but a downstream pressure sensor indicates that the actual boost pressure is 95 psi, system 501 can transmit a warning signal indicating a problem with the suction hose. In yet another example, during pressure testing after a line has been primed, if a pump shows no change in pressure, system 501 can determine that the suction valve may be closed and transmit a warning to the operator to check the suction valve or actuate the suction valve. In this way and others, system 501 can utilize multiple sensors in the blender system (e.g., 1000) to control the blender operations.

In some hydraulic fracturing operations, a group of pumps will pump sand on a first side (e.g., the dirty side) and a group of pumps will only pump fresh water on a second side (e.g., the clean side). This operation is sometimes referred to as a split stream operation (also known as slipstream operation) and is usually completed with a blender and a separate centrifugal pump as its own piece of equipment. Each blender of the multi-blender system (e.g., 410) described herein can operate as both clean and dirty sides and can be configured to maintain split stream operations in the event of a failure of one of the blenders and maintain operation integrity in the event of a component failure.

While split streaming, if the clean side runs into operational issues, system 501 can be configured to increase suction pump rate on the dirty side, while increasing discharge pump operations. For example, an isolation valve can be opened to send dirty fluid over to the clean pumps to maintain pumping operations. System 501 may then increase the rate of the dirty side to maintain previous job parameters such as rate and sand ratio between the clean and dirty side. The dirty side can then be operated to continue running until the clean side can be repaired and inspected. Additionally, or alternatively, based on detection of an operational issue on the dirty side, system 501 can be configured to switch the clean side to operate as the dirty side if there are multiple sand transport systems available or flush the well before shutting down.

Although FIG. 4A shows three (3) controllers, a different number of controllers could be used, or one controller could be used to perform the function of the three controllers. For example, FIG. 4B shows a schematic view of an embodiment of the multi-blender system without the master controller (e.g., main blender controller 500) and the functionality of the master controller, as described above with respect to FIG. 4A, is handled by the two sub-blender controllers 535, 540, individually, or in cooperation with one another. Each sub-blender controller may be in communication with one another and can be configured to facilitate the operation of one or both blenders in the event of failure of one of the sub-controllers or failure of one of the blenders or both. For example, each of sub-blender controllers 535, 540 can receive the same instructions from datavan 545 and determine which instructions are directed to the Blender 1 controller and which instructions are directed to the Blender 2 controller. The sub-controller may then perform operations relevant to the functions of its associated blender and ignore the operations associated with the other blender. However, in the event of the failure of one of the sub-controllers (e.g., sub-controller 535), the other sub-controller (e.g., sub-controller 540) can facilitate the operations of both Blenders. To illustrate, data van 545, or other control system, can instruct sub-controller 535 to stop ignoring operations associated with the other blender and instead perform such operations. In this way, and others, sub-blender controllers 535, 540 can provide redundant communication for the multi-blender system. FIG. 5 shows a schematic view of another embodiment of a multi-blender system. FIG. 5 is substantially the same as FIG. 4A without the Blender 1 Controller (e.g., 535) and Blender 2 Controller (e.g., 535). In FIG. 5, the main blender controller can perform the functions of the Blender 1 Controller (e.g., 535) and Blender 2 Controller (e.g., 535).

The blender system (e.g., 410) and associated control system 510 can achieve several advantages to the hydraulic fracturing operation. For example, packing of a well and the need for additional wire line operations can be avoided, thereby reducing overall customer costs and avoiding additional time taken to stimulate a well. Also, the possibility of cavitation in the hydraulic fracturing pumps can be avoided by maintaining proper boost pressure, thereby preventing potential failures such as fluid end cracking, or power end failure.

Further, operational efficiency can be improved by decreasing potential nonproductive time. In the event of a single component failure, operations can continue and troubleshooting can be performed on the single failed component, which allows for less downtime. Also, if a single side of the blender is in need of repair, the other blender can continue operations while the required planning and logistics are made to make the repairs. This reduces downtime further as it is not necessary to rig out the blender and install a spare blender.

Figure 6:
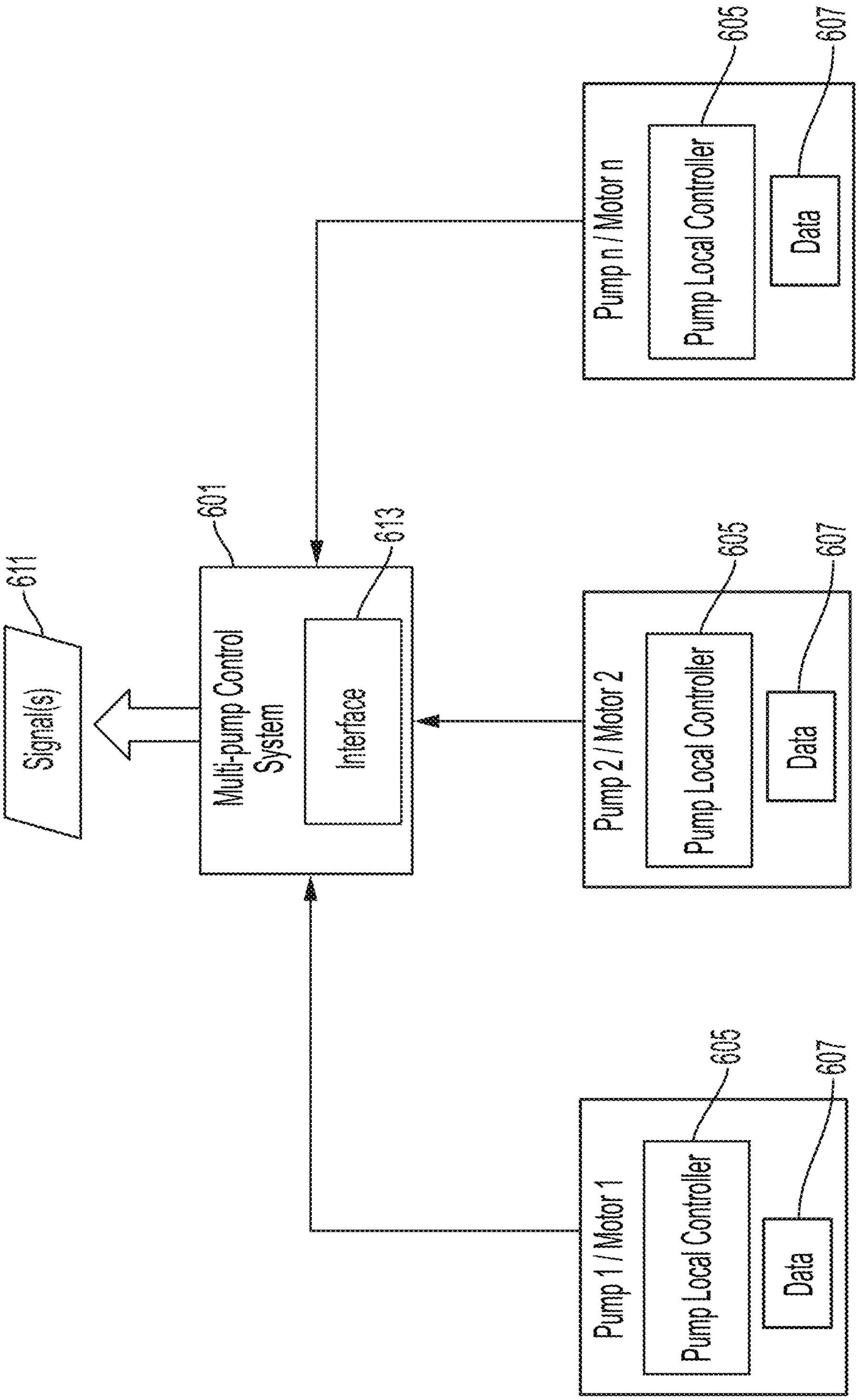
FIG. 6 shows a system for monitoring the health of the components of the blender system according to an embodiment of the present disclosure.

Referring now to FIG. 6, each of the pumps (e.g., 422, 426) in the blender system (e.g., 410) can include a pump local controller 605 that is configured to be in communication with multi-blender control system 601, which may include one more controllers (e.g., 30) or other components (e.g., components of control system 1010). Control system 601, controllers 605, or both can be used to store pump information data (e.g., 46) as pump profile data 607 such as operational data, maintenance data, equipment set up data, alarm history data, prime mover information, volumetric efficiency and equipment health ratings. For example, each local controller 605 can store or transmit pump profile data 607 for its respective pump of the blender system (e.g., 419). Each piece of stored pump information data can be used throughout the operation process by the blender control system (e.g., 501 of FIG. 4) or other controller (e.g., 30 of FIG. 3) to protect equipment, enhance efficiency, determine pump eligibility and aid the operations team to judge the operation condition of the equipment.

Operational data stored in the pump profile data can hold information such as motor RPM and discharge pressure during last stage, average operating hydraulic horsepower (HHP), max pumping values (pressure, RPM, rate, etc.) achieved, motor power draw (amps, HP, torque, etc.), motor temperature sensors, pump discharge pressure, pump/motor encoder, discharge sand concentration, discharge and suction rate, centrifugal pump efficiency, historical pump averages and valve position feedback, etc. This data can be used to adjust the historical values and trends of the individual motor and pumps. The historical averages and trends can be used to monitor the health of the major components of the blender specifically the suction and discharge pumps and motors.

Maintenance data for the pumps and motors can be stored in a supervisory controller to alert the operator of upcoming maintenance cycles, inspection schedules and other data such as total sand that has passed through each component.

Equipment configuration data allows the serial numbers and part numbers of pumps and motors to be stored, which can aid with traceability of equipment and distinguishing installation times as well as allowing the operation to realize when a pump or motor is coming to the end of its life cycle. The historical data can also determine if there is an immediate issue with the component. For example, if operating values are outside certain range of historical trends, the blender control system 601 can transmit an alert to an operator, supervisor or operations support that there is a current issue with the component. The pump profile data may act as a scorecard that indicates the projected life and preferred range for these performance values. This data can be used to map the historical data to show the optimal ranges for these performance variables as show the projected life of a component. For example, a high vibration reading on a suction pump motor in the absence of suction pressure fluctuation may suggest that the pump bearing may experience imminent failure. The vibration amplitude and vibration pattern can be used (e.g., by control system 601) to determine the possibility of imminent failure. Also, the temperature increase on the bearing and voltage increase in the motor can be used (e.g., by control system 601) to determine the health of the motor. Using this pump profile data, the control system 601 or controller (e.g., 30) can limit the amount of use of these components. For example, if a bearing temperature has exceeded a predetermined temperature a certain number of times, then the controller can limit a maximum rpm, flow rate, pressure, or other parameter of the associated pump to limit the amount of work the pump can do. As more data is collected, a control system 601 can develop a model, such as a predictive model, to predict a time of failure of a component. For example, based on the historical bearing temperature and vibration data, a predicted failure time can be calculated by control system 601. If one pump is somewhat compromised, the control system 601 can operate the compromised pump with another healthy pump in order to preserve the life of the pump that is compromised. As another example, based on the flow rate, torque, vibration and bearing heating of a suction pump, a maximum allowable limit for sand ingestion can be calculated, which can be communicated to the operator (e.g., via one or more alerts or interfaces). By using data from various subsystems throughout the blender system (e.g., 401), rather than using only data from an individual component, multiple pieces of data can be used to diagnose the condition of the blender system. In addition, when a parameter is changed, such as flow rate, based on the reaction of the system to these changes, the system can be further diagnosed.

Equipment alarm history from the pumps, motors and engines can be made available to the operator and to the blender control system 601 in order to control the utilization of the pump and motors. For example, the time at which a pump experiences a life reduction event or the amount of time a life reduction event is occurring can be recorded and totaled and can be used as a factor to reduce the pumps usage. Life reduction events can include exposure to cavitation events and severe pulsation, abrupt emergency shutdowns and total amount of sand pumped.

Additionally, volumetric efficiency of each of the pumps can be tracked over time accounting for the changes in density of the treatment fluid as sand concentration changes. The blender control system 601 can use this historical data to optimize the pump usage to maximize pump efficiency while minimizing pump rpm and load. For example, if discharge pressure from pressure transducer in discharge piping drops below a target pressure or varies by a target pressure delta a pre-defined number of times in a certain time interval (e.g., three times in 30 seconds), while the speed of the pump is above a specified threshold, blender control system 601 may increase the speed of the pump. Once discharge pressure conditions are maintained or stabilized, blender control system 601 can increase or decrease the speed of the pump by a certain amount.

Blender control system 601 can enable precise and extensive monitoring of all blender components with the tracking of all contributing variables that could indicate a future problem with the pump or other component that can be identified before the problem begins. In such configurations, it possible to plan and prompt major inspections and maintenance ahead of time and can prevent bringing pumps, motors and other components to a well site when they are close to exceeding their operational cycle limits. Such configurations may also allow for the discharge pumps to distribute load appropriately to maximize component life and maintain reliability. For example, any reading that deviates approximately 10% from the original design specification, could be flagged as requiring attention or maintenance. As a further example, when two discharge pumps are running, the life of the discharge pumps can be extended by running the discharge pumps at a reduced speed (e.g., at half speed). If one of the suction pumps is operating at a reduced pressure, then the speed of the corresponding discharge pump can be reduced while increasing the speed of the other discharge pump. Blender control system 601 may provide a life expectancy of any number of pumps so that a pump with more life expectancy can be preferentially used in favor of a pump with less life expectancy in more demanding applications.

As shown in FIG. 6, the data 607 (e.g., pump information, operational data, maintenance data, alarm history, equipment configuration data, etc.) that is sent to the multi-pump control system 601 can be utilized by the multi-pump control system (or controller thereof) to determine a health assessment of each piece of equipment in the blender system. The assessment can be displayed to the operator via an interface 613. For example, interface 613 may display an image in the form of a basic color schemed diagram, so that the operator or maintenance technician can determine what pieces of equipment have severe failures or need attention. In some configurations, the multi-pump control system 601 can provide additional information regarding each component (e.g., via interface 613). As an example, interface 613 can display a number of time that a particular pump or particular component of the pump experienced a life reduction events which can help maintenance personnel troubleshoot problems or distinguish the origin of a problem. In addition, the multi-pump control system 601 can transmit signals 611, such as push notifications to maintenance personnel, other control systems, controllers, or the like. Signals 611 may include an alert warning an operator of required upcoming preventative maintenance schedules, an alert of an exceeded threshold (e.g., pressure, rpm, operation time, particulate concentration, or the like), or other alert. In some configurations, multi-pump control system 601 can include or correspond to control system 1010 or one or more components thereof. For example, interface 613 can include or correspond to interface 50, I/O device 54, or both; pump controller 605 may include or correspond to pumps 200, controller 215, or both; signals 611 can correspond to signals 48, or combination thereof.

Figure 7:
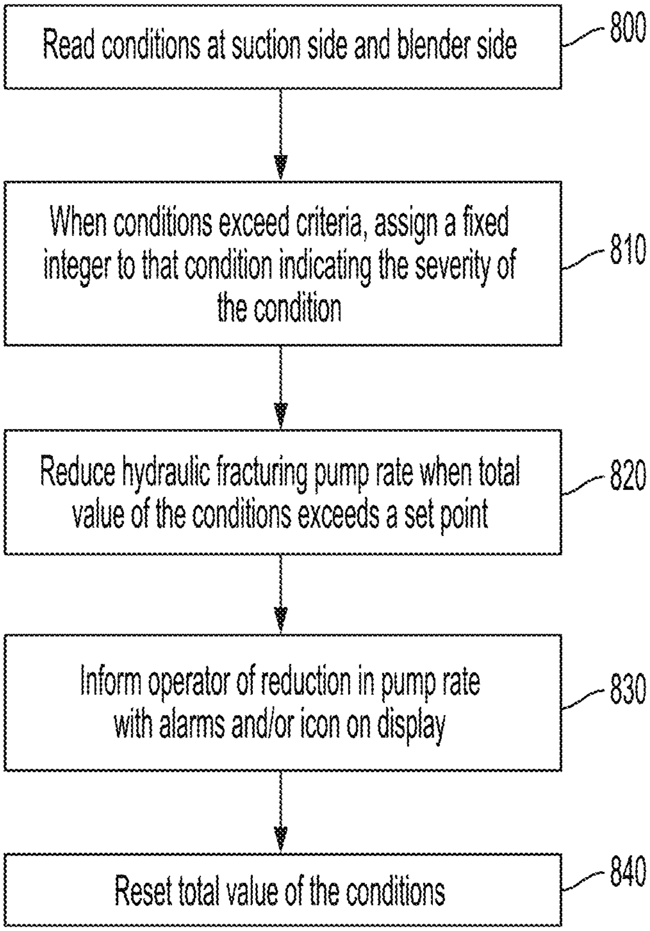
FIG. 7 shows a method of detecting pump cavitation & fluid aeration according to an embodiment of the present disclosure.

In some configurations, the blender control system, such as control system 1010, 501, 601, can be configured to detect pump cavitation, fluid aeration, or both and, based on this detection, perform one or more actions. For example, the control system can perform an adjustment sequence to mitigate the harmful events of cavitation, as shown in FIG. 7. In some configurations, pump cavitation and aeration can be detected by examining the conditions at the suction and discharge side of the blender system, at step 800 of FIG. 7. The conditions/data that can be used to determine a cavitation or aeration event can include: (1) pump rpm; (2) net positive suction head (NPSH); (3) net positive suction head required (NPSHR); (4) sand concentration; (5) sand proppant rate; (6) the differential pressure between the blender discharge and the suction pressure; (7), voltage fluctuation; (8) torque fluctuation, or other data point as described herein. This data can come from the datavan (e.g., 545), control system, or an external data source. In some configurations, the control system may set a criterion (e.g., threshold) for each one of these data points and exceeding the criterion may result in the determination of a cavitation condition. The criterion may include a tiered approach to severity, wherein each tier gives a fixed integer so that when a condition is met, the integer value for the severity of the condition is pushed to the control system, at step 810. If the detected cavitation event is high (e.g., condition signification exceeds threshold), the blender may be shut down quickly before diagnostics can be done. However, shutting down too quickly can cause further cavitation. In some configurations utilizing the tiered approach, first the top level is increased, then the pump speed is slowly stepped down while adjusting the top level automatically. Then, the blender rate can be reduced followed by a reduction in the pump speed. The control system can track the occurrence of cavitation conditions at each individual pump and can sum these events until the number of cavitation conditions exceeds a set point (e.g., cavitation threshold). An example set point can be three (3) cavitation events. Based on a number of detected cavitation conditions exceeding this set point, the control system can intervene and reduce the hydraulic fracturing pump rate while asynchronously reducing the same rate at the blender discharge at step 820. Therefore, the control system can monitor multiple pieces of data (e.g., pump rpm, NPSH, NPSHR, NPSHA, sand concentration, proppant rate, pressure differential, voltage fluctuation, or torque fluctuation) to detect cavitation event and perform one or more actions to limit the damage to components of the blender system. In the depicted configuration, the control system can transmit one or more alerts, signals, or alarms to notify the operator of a change in pump rate, at 830. For example, the control system can actuate a visual or auditory alarm, initiate an alert on a display, or the like.

In some configurations, the conditions are constantly monitored. In some configurations, the tracking or storage of a number of occurrences of breached conditions (e.g., cavitation conditions) for a particular pump or component can be reset after actions are performed, at 840. For example, after reduction of pump rate, the control system can be configured to determine whether the reduction in rate stopped the problem (e.g., condition exceeding threshold). In such configurations, if the set point is breached again, the control system can further reduce the hydraulic fracturing pump rate. Every time the pump rate is adjusted, the operator can be informed and alerted through alarms as well as an icon a display (e.g., interface) showing a present cavitation state (e.g., 830). The presence of these events can contribute to a life reduction event which is stored in the pump 'Profiler', which can be a used to reduce the maximum allowable flow rate the blender can provide.

In some configurations, the adjustment sequence used to combat the pulsation and cavitation events can include adjusting the rate output of the individual pumps and sequencing the rate outputs of the pumping fleets in order to make suction flow laminar into the suction manifolds of the pumps and reduce the speed at which the pump cranks are turning. For example, after detecting a problem with the suction manifold pressure at a given pump, the control system may reduce the rpm of a pump upstream to maintain required pump flow rate and discharge pressure. Additionally, or alternatively, high frequency sampling and high frequency pump motor loads can be used to detect high frequency fluctuation in pump pressure and store these events.

An illustrative non-limiting example of the programming logic (e.g., 42) executed by the above-described control system may be as follows:

From the pressure transducers in the individual pumps suction piping: If pump X NPSH pressure (net pressure suction head)<net pressure_suction_head_required, then increase Pump Y rpm while decreasing pump X rpm. A feedback control loop can be used to confirm that both pumps are not cavitating.

If NPSH of pump 1 varies by approximately +/−10 psi a number of times in a 30 second interval, increase pump 2 rpm and decrease pump 1 rpm.

Such configurations can mitigate pump cavitation using condition monitoring, resulting in the preservation of fracturing pump components/consumables and the pump assembly while also extending the life of the blender pumps and autonomously prevent cavitation of the blender components as well as prevent aeration of the fluid flowing to the hydraulic fracturing pump. In some configurations, the control system can autonomously react to potential problematic states at the pump to prevent the disruption of a pumping operation, such as taking pumps offline, bringing pumps online, ramping up pumps, or the like. In some such configurations, multiple pump variables can be processed to automatically detect cavitation events, that may be undetectable from human monitoring.

The amount or occurrence of life-reduction events or cavitation conditions can be stored and counted to determine a likelihood of failure and alert the maintenance team or operator of issues such as wear or failure. For example, the control system can enable real time monitoring and display of a condition (e.g., via display on an HMI screen of the control panel) so an operator can be made immediately made aware the event is present. In some configurations, the control system is configured to assign the event or condition to a particular pump identification and store the information in the pump profile. The recorded events into the pumps' profiles allows maintenance teams to prioritize which units are to be inspected when performing maintenance. In some configurations, the control system may be configured for autonomously sequencing of both blender and pumps to optimize suction pressures can be performed. The recordation and detection of the events and conditions can be used by the control system (e.g., via pre-programed logic) or the operator to determine whether a pump can pump at maximum capacity.

Figure 8:
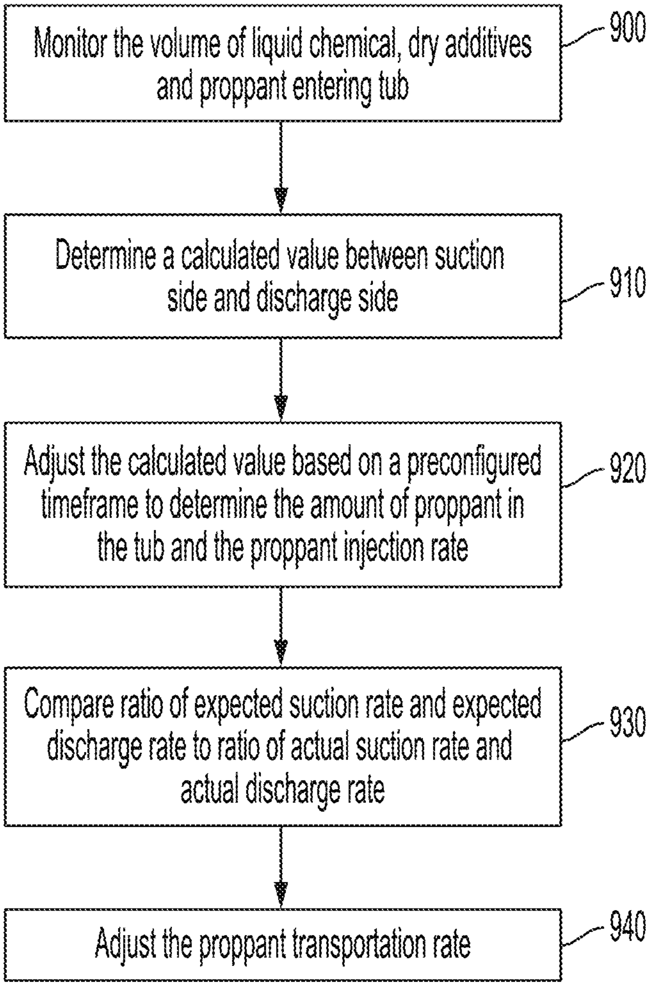
FIG. 8 shows a method of adjusting the proppant injection rate according to an embodiment of the present disclosure.

Referring now to FIG. 8, a method of operating a blending system (e.g., 410) is shown. The method may be performed by a control system (e.g., 1010, 501, 601) or controller (e.g., 30, 500, 535, 545). As an illustrative example, the master blender controller 500 can be used to automatically adjust the proppant injection rate of the sand transport system 505 so as to reduce the amount of time required to flush the well of sand, thereby reducing the chances of well screen out. In some configurations, the time reduction is proportional to the size of the tub.

This control system operation may be dependent on measured parameters (e.g., current sand proppant transportation rate) and historical trends. For example, in some configurations, a ratio between clean rate and discharge rate while the tub level is maintained is dependent on the chemical and sand additive injection rate. The greater the amount of sand or chemical that is being placed into the tub, the more water the additives displace. In such configurations, the suction rate can drop below the discharge rate while maintaining tub level.

The control system can be configured to monitor the volume of liquid chemical, dry additives, and sand entering the tub, at step 900. In some configurators, the control system (e.g., 501, 601, 1010) can be able to determine a calculated value between the suction and discharge side of the blender, at step 910. The calculated value between the suction and discharge side of the blender can be determined based on the volume of liquid chemical, dry additives, and sand entering the tub. For example, this can be done by subtracting the measured values of a suction flowmeter and a discharge flowmeter of the blender system. The calculated value between the suction and discharge side of the blender may then be adjusted based on a pre-determined timeframe to adjust for the tub level changing, at step 920. In such configurations, the control system can determine a running, real time value for the amount of sand currently in the tub and the sand injection rate. The control system may then compare a target clean vs dirty rate ratio to a measured clean vs dirty rate ratio (e.g., data flow meters are currently reading), and can then again adjust for tub level changes, at step 930. Based on the actual suction vs discharge ratio being out of compliance with a target ratio, the control system can automatically adjust the proppant transportation rate, at step 940. For example, the control system may adjust the dosage rate by the sand transport system. In an illustrative configuration utilizing an auger sand transport system, the control system may adjust the pulses per unit (PPU) to adjust the sand dosing rate. In other configurations in which a conveyor sand transport system is employed, the control system can adjust the speed of the belt to adjust the sand input rate. In some configurations, the control system can continue to adjust the sand transport system, flow rates of suction or discharge pumps, or the like, until the clean and dirty flow rates match (e.g., arrive within 15, 10, 5, 3 or 1 percent of) the target clean and dirty flow rate based on the additive rate.

In some configurations, in the event of a potential well screen out and increasing pressure, the control system can be configured to minimize the amount the time it takes to flush the well. At higher sand concentrations, the control system may slow down the suction flow (e.g., without decreasing discharge flow) to temporarily drop the tub level in order to flush sand down quickly. In some configurations, based on the tub level reaching a target value, the control system can operate the suction pump to increase the flow rate, bringing the tub level up to its max quickly, which will dilute any remaining sand in the tub. In other configurations, at low sand concentrations, the control system can increase the tub level while decreasing (e.g., stopping) the amount of incoming sand to dilute the sand concentration in the tub. In the described configuration, the control system can perform one or more actions to prevent or limit the risk of well screen outs and shorten the time required to flush the well.

In some of the described configurations, the sand injection rate can be self-adjusting, thereby removing the need for logistically tracking every stage by an operator. In some configurations, a feedback loop can be created between the blender (e.g., 416) and the sand transport system (e.g., 412) to prevent erroneous sand transport rates and provide a more accurate measure of the amount of sand pumped during each stage or pad of the operation. This may reduce the amount of time required to flush the well of sand, thereby reducing the chances of well screen out. Such a time reduction can be dependent on the blender tub size and, for large tub volumes, the time to flush the well can be higher. When attempting to flush the well, the control system can decrease the amount of sand entering the tub in a particular time interval and spreading it over a longer time interval rather than introducing high concentrations of sand a one time. Such operation can mitigate the increase in pressure due to the hydraulic fractures from being filled by high concentrations of sand. Often when the calibration values of conventional sand transport systems are found to be out of compliance, the total sand pumped can be off by tens to hundreds of thousands of pounds out of compliance. By modifying the values on the fly automatically, it is possible to minimize any errors or changes over time of the calibration to maintain accurate sand injection rates. The described control systems can reduce the amount of tracking and required adjustments during operation while also maintaining accurate sand transportation estimates and removing inaccuracies with the sand transport rate. In some configurations, the self-learning sand transportation rate and automatic calibration can be adjusted on the fly using current and historic data. For example, the difference between the outgoing flow rate and the incoming flow rate can be used to calculate the actual mass that is flowing into the blender. The control system may then compare this calculation with an overall mass calculation determined by the sand transport system. The deviation between these two mass values may increase over time and the control system can utilize this deviation to calculate a normal deviation for that piece of equipment over time. When this deviation exceeds a threshold, such as 5%, the control system can adjust the mass value or other operations of the sand transport system to minimize the deviation. The control system can also utilize the sand type to adjust or modify the operations. In some configurations, the actual flow rates, the profile of the sand transport system and profile of the sand type can be used to adjust the sand transportation rate. Using the historical data of the sand transport system and the historical data of the sand, the characteristics and life of the equipment can be mapped out. Based these parameters, the demand for sand can be adjusted by the control system. In some configurations, the control system can use the actual mass of sand in the tub, rather than the current requested sand concentration.

Some of the above control system can be used during simultaneous fracturing operations, which allows for fracturing of two wells in parallel. In some configurations, a multi-blender system having two separate blenders can be used to feed the two separate fleets. For example, a dual blender system can have two independent blenders mounted on the same unit controlled using a shared blender control system (e.g., 501, 1010). Each separate blender can comprise a separate tub, proppant transport system, chemical additive unit, pumps etc. This makes it possible to independently control both fracturing fleets so that the two wells can have independent fracturing conditions. For example, each fleet can pump at different sand concentrations, a different amount of fluid volumes, different chemical loadings, different treatment schedules, etc.

In some configurations, the described control systems (e.g., 501, 1010) can utilize two separate blenders and provide dual redundancy for both fracturing fleets in a simultaneous fracturing operation. To illustrate, in the event of a mechanical or electrical failure on one of the blender components, the control system can automatically adjust for the remaining active blender to feed fluid to both fracturing fleets. The blender control system can automatically redirect flow to the other fleet using cross over valves, for example, to feed both fleets fracturing fluid. In some configurations, the control system can slow down the hydraulic fracturing pumps (e.g., pump rate) to one or both independent fleets to maintain job reliability without cavitating the pumps. In this way, and others, the control system can continue the job operation after failure of a blender or component thereof (e.g., at the reduced rate) to finish the stage or to flush both wells.

In some configurations, the dual blender system can be used to instantaneously change the fluid treatment system type. For example, one blender tub could be running high concentration while the other is running diverter/fibers or other proppant material. This multiple tub and pump system allows for instantaneous swapping and pulsing between the two tubs. For example, in some configurations, control system can accomplish this operation actuating mechanical valves and speeding up or slowing down the pumps (e.g., to target rates).

In some of the multi-blender systems, simultaneous fracturing operations can be operated or controlled based on different treatment schedules, sand concentrations, volumes, time length, etc. In some configurations, the control system can provide dual redundancy to two separate fleets using only two blenders such that redundant simultaneous operations can be provided without requiring additional blender units in the event of component failure. In some configurations, the control system can be configured to utilize multiple types of proppant, chemicals, or dry additives that can be run simultaneously to a single or multiple hydraulic fracturing operation. Some such configurations can reduce the likelihood of a sanded off well by providing a backup to flush the well. The control system can be configured to automatically adjust valve configuration to maintain blender boost pressure to prevent potential cavitation, sand off and remove the need to shut down and prime pumps. In some configurations, the control system can be configured to dilute a sand concentration in a blender tub by opening the valve on the water side. Whereas in a single tub system, it is necessary to switch out the tub, or wait for the sand concentration in the tub to change. Additionally, or alternatively, in the dual-tub system, the sand concentration can be quickly increased by closing the valve on the water side. This makes it possible to quickly control the proppant concentration as compared to the conventional method.

Referring now to FIGS. 9A-9E, shown are various views of a blender system 910 (e.g., multi-blender system) which can be utilized in hydraulic fracturing operations, such as those described herein. Blending system 910 is configured to mix fluid (e.g., from a hydration unit) with one or more additives (e.g., from a sand transport system, chemical additive unit, dry additive unit, or the like) and deliver the fluid to one or more other components in the fracturing system. In the depicted configuration, blending system 910 includes two separate blending units each having a suction pump, a tub, and a discharge pump. Each blending unit can be coupled to a power source, such as a generator, to transfer fluid between components of the hydraulic fracturing system and can be utilized for operation in single hydraulic fracturing operations and simultaneous hydraulic fracturing operations as described herein.

Figure 9A:
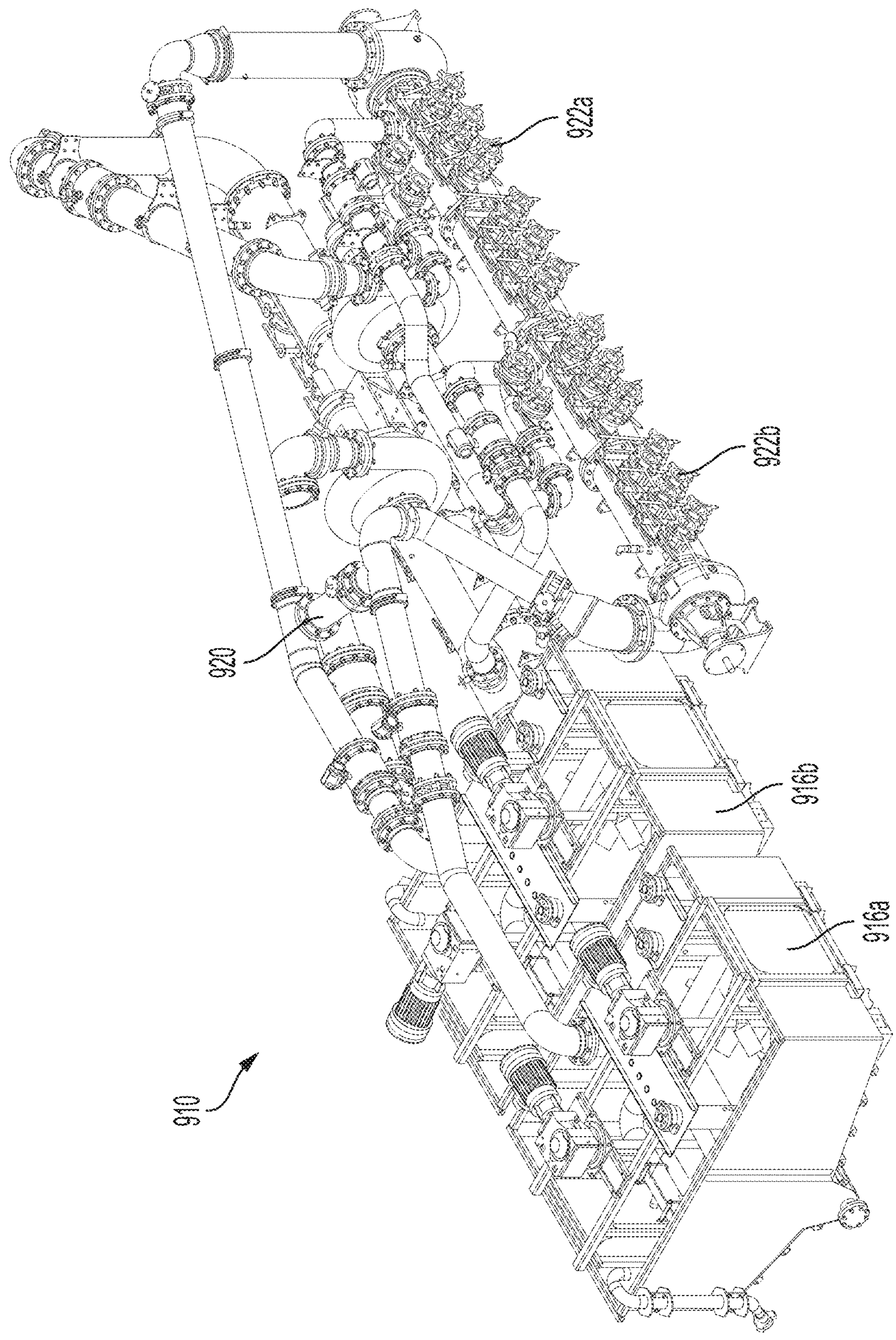
FIG. 9A shows a perspective view of a blending system according to an embodiment of the present disclosure.
Figure 9B:
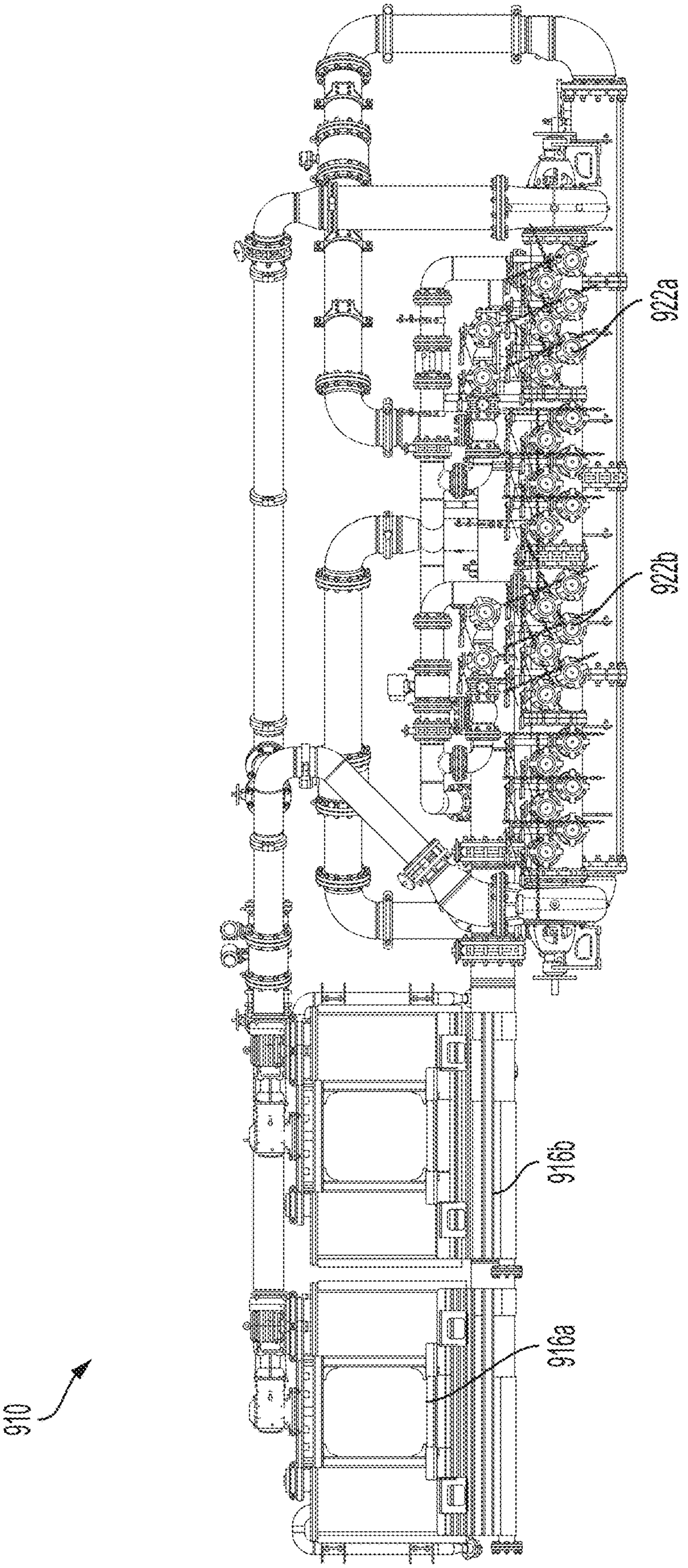
FIGS. 9B and 9C show first and second side views of the blending system of FIG. 9A.
Figure 9C:
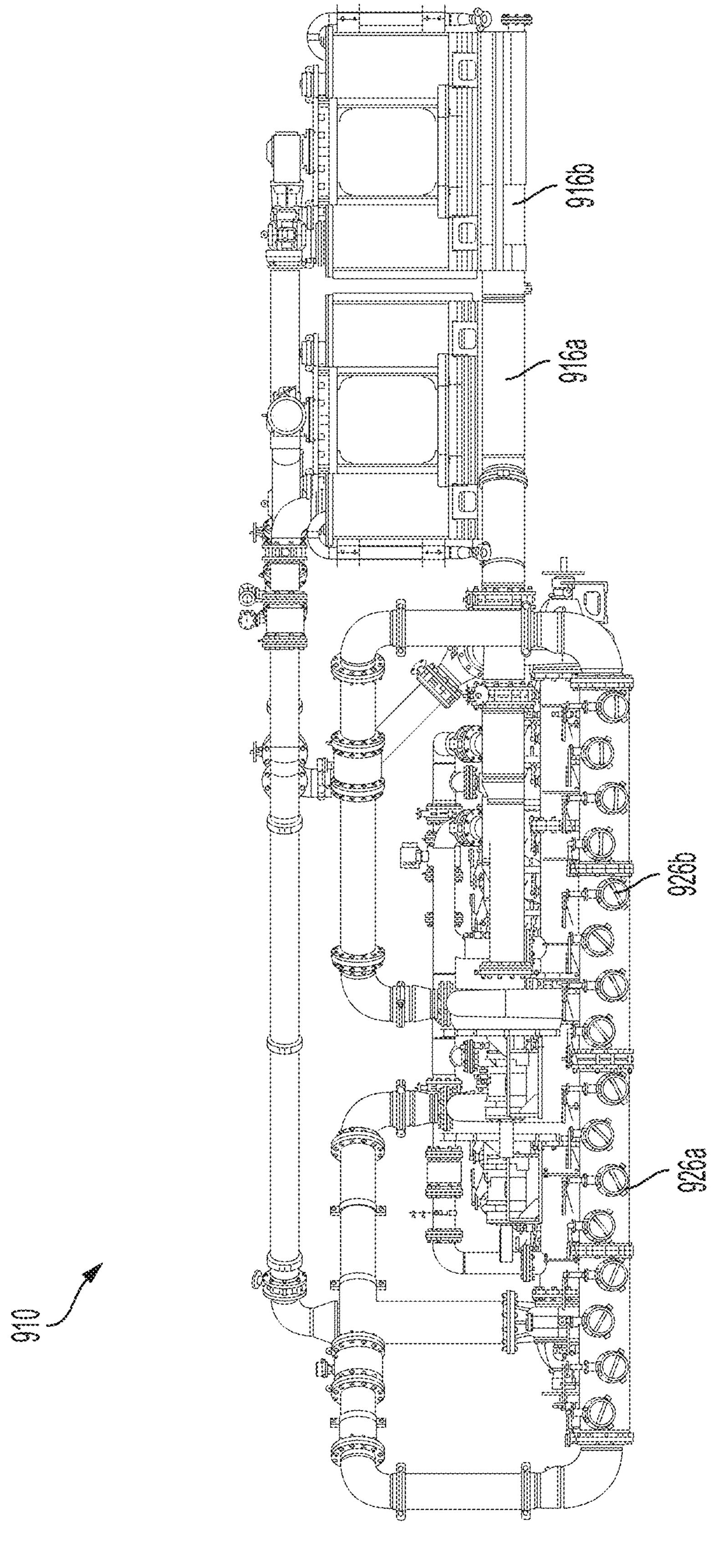
Figure 9D:
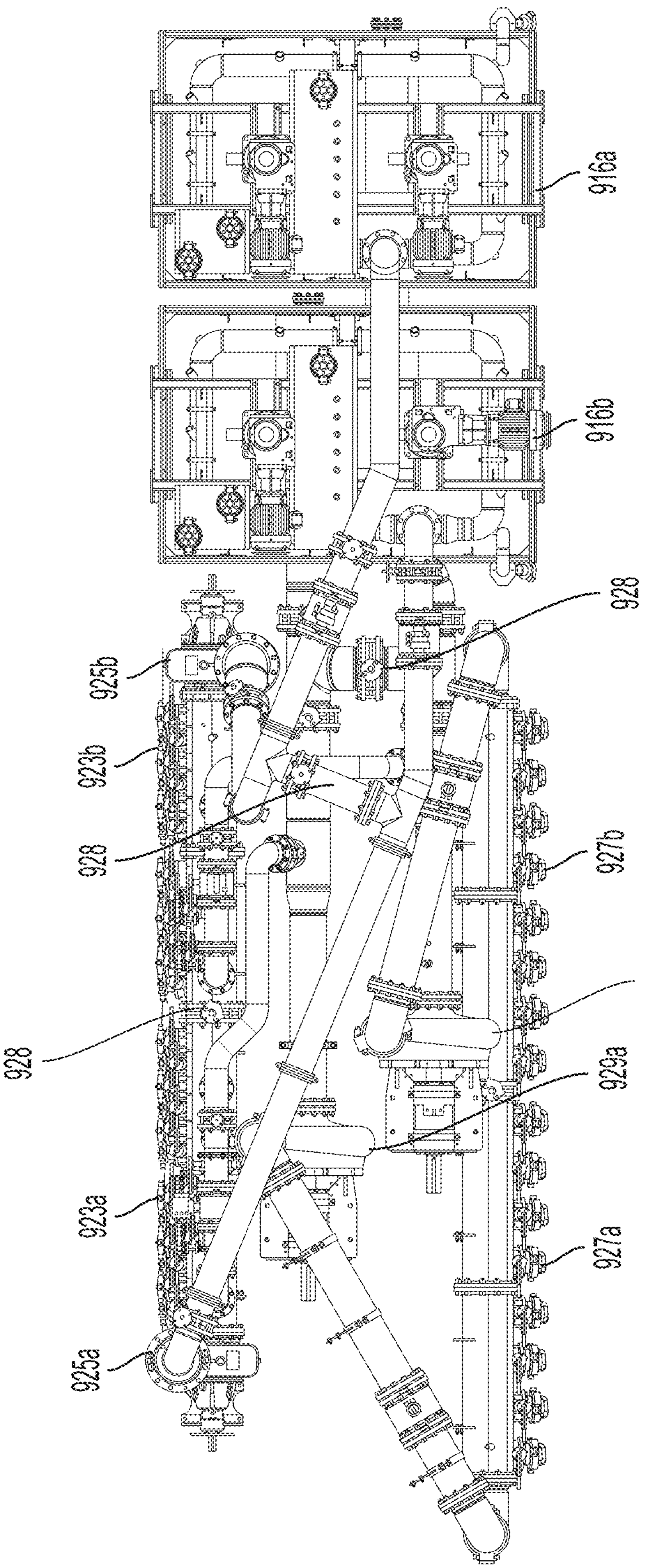
FIG. 9D shows a top view of the blending system of FIG. 9A.
Figure 9E:
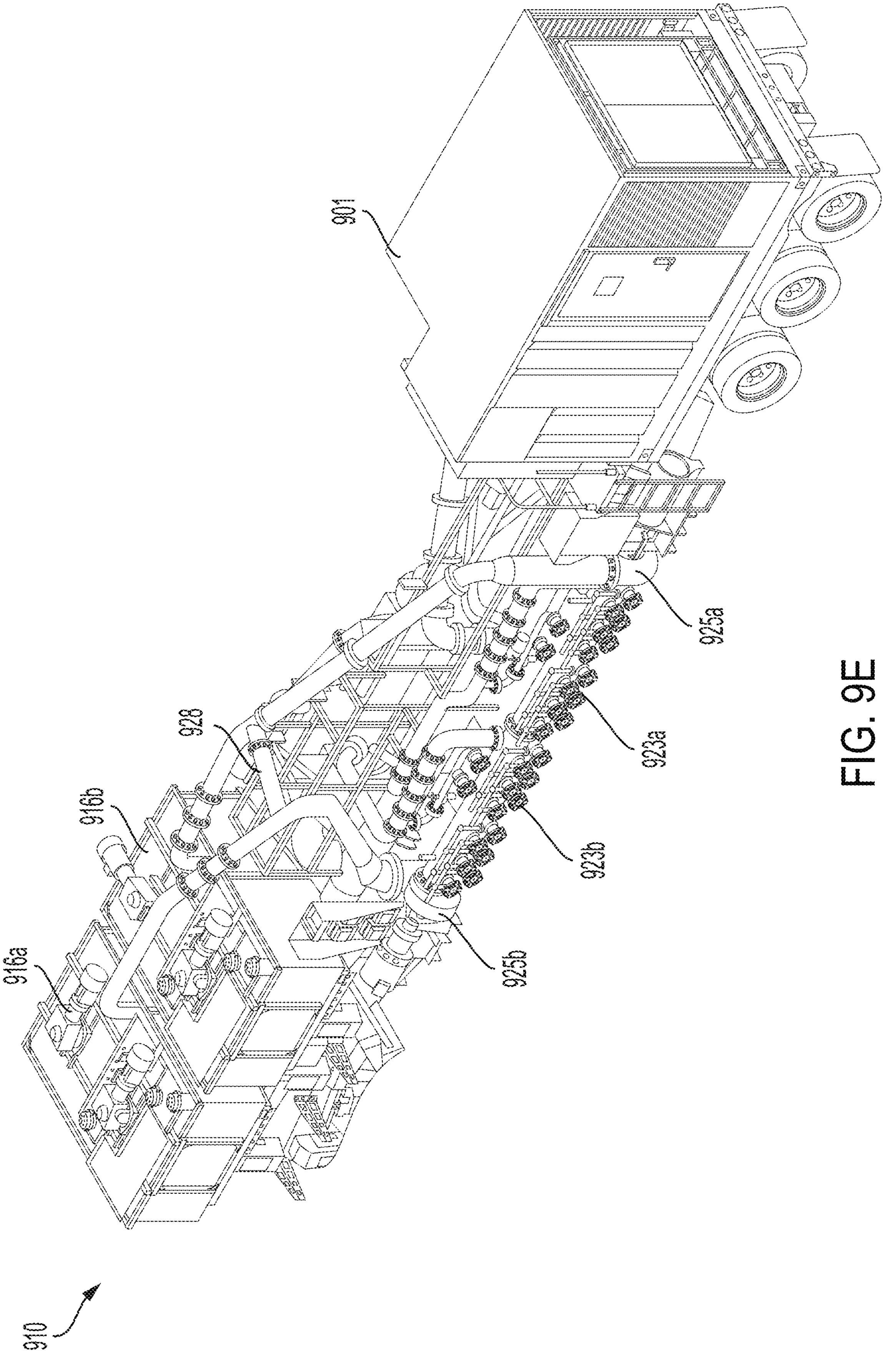
FIG. 9E shows a perspective view of the blending system of FIG. 9A mounted on a trailer frame.

As best shown in FIG. 9B, blending system 910 includes a first blender unit having a first suction pump system 922*a*, a first mixing system 916*a*, and a first discharge pump system 926*a* and a second blender unit having a second suction pump system 922*b*, a second mixing system 916*b*, and a second discharge pump system 926*b*. First and second blender unit can be positioned adjacent each other on the same trailer (e.g., as shown in FIG. 9E). Each blender unit can be operated via the control systems described herein and can be configured to provide redundancy in the event one of the blender units fails. For example, blending system 910 includes one or more crossover lines 928 configured to transfer flow between different components of the first and second blender unit at various points, as described herein.

First suction pump system 922*a* includes a plurality of ports 923*a* (e.g., manifold) in fluid communication with one or more pumps 925*a*. First suction pump system 922*a* is configured to be fluid communication with first mixing system 916*a* and second mixing system 916*b* (e.g., via crossover line 928). Pump 925*a* is configured to deliver fluid from ports 923*a* (e.g., suction manifold) to the mixing systems. For example, in some configurations, first suction pump system 922*a* is configured to deliver fluid exclusively to first mixing system 916*a* and, in other configurations, the first suction pump system 922*a* is configured to deliver fluid to second mixing system 916*b* via a crossover line 928 (e.g., via actuation of a crossover valve). First discharge pump system 926*a* includes a plurality of ports 927*a* (e.g., discharge ports) in fluid communication with one or more pumps 929*a* (e.g., discharge or boost pumps). First discharge pump system 926*a* is configured to be in fluid communication with first mixing system 916*a* and second mixing system 916*b* and is configured to deliver fluid or mixed fluid (e.g., slurry) from the mixing system to ports 927*a* (e.g., discharge manifold). Pumps 925*a*, 929*a* are coupled to a power source, such as a motor, that is configured to drive the pump and, in some configurations, can include a centrifugal pump.

Second suction pump system 922*b* includes a plurality of ports 923*b* (e.g., manifold) in fluid communication with one or more pumps 925*b*. Second suction pump system 922*b* is configured to be fluid communication with first mixing system 916*a* and second mixing system 916*b* (e.g., via crossover line 928). Pump 925*b* is configured to deliver fluid from ports 923*b* (e.g., suction manifold) to the mixing systems. For example, in some configurations, second suction pump system 922*b* is configured to deliver fluid exclusively to second mixing system 916*b* and, in other configurations, the second suction pump system 922*b* is configured to deliver fluid to first mixing system 916*a* via a crossover line 928 (e.g., via actuation of a crossover valve). Second discharge pump system 926*b* includes a plurality of ports 927*b* (e.g., discharge ports) in fluid communication with one or more pumps 929*b* (e.g., discharge or boost pumps). Second discharge pump system 926*b* is configured to be in fluid communication with first mixing system 916*a* and second mixing system 916*b* and is configured to deliver fluid or mixed fluid (e.g., slurry) from the mixing system to ports 927*b* (e.g., discharge manifold). Pumps 925*b*, 929*b* are coupled to a power source, such as a motor, that is configured to drive the pump and, in some configurations, can include a centrifugal pump.

One or more crossover lines 928 are disposed between the first and second blender units. For example, a crossover line can be disposed between the mixing system (e.g., 916*a*, 916*b*) and the discharge pump system (e.g., 926*a*, 926*b*). In some configurations, a crossover line can be posited between ports 923*a* (e.g., first suction manifold) and ports 923*a* (e.g., second suction manifold), between the suction pumps (e.g., 925*a*, 925*b*) and mixing system (e.g., 916*a*, 916*b*), between the mixing system (e.g., 916*a*, 916*b*) and discharge pumps (e.g., 929*a*, 929*b*), between the ports 927*a* (e.g., first discharge manifold) and ports 927*a* (e.g., second discharge manifold), or combination thereof. For example, crossover line can (e.g., 928) can be configured to deliver water from the first blender unit (e.g., first suction pump system 922*a*) to the second blender unit (e.g., second mixing system 916*b*) and, in some configurations, back to the first blender unit (e.g., first discharge pump system 926*a*).

First mixing system 916*a* and second mixing system 916*b* can be separate from the suction and discharge pump systems (e.g., pumps 925, 929). For example, first and second mixing systems 916*a*, 916*b* may be configured only to mix the fluid (e.g., slurry) and not pressurize or discharge the fluid. For example, as shown in the depicted configurations, pumps 925, 929 can be configured to discharge the fluid from first and second mixing systems 916*a*, 916*b* and are spaced from the mixing systems. In such configurations, a crossover line is able to be included between the mixing systems 916*a*, 916*b* and the discharge pumps 925, 929. This is contrary to the traditional mixing systems that integrate the mixing tub and the pump to save space and provide more compact blender. In the depicted configurations, by including a crossover line 928 between the mixing systems 916*a*, 916*b* and the discharge pumps 925, 929, each pump can be configured to draw fluid from either mixing tub. Such configurations allow near instantaneous switching between mixing tubs and, in a split streaming process, enable near instantaneous switching between a fluid-only tank and a slurry tank (e.g., to change slurry density or flush the well) without sacrificing pressure, flow rate, or other performance parameters. Blending system 910 can be configured to switch flow between other components of the first and second blender units in the in the event of failure of one of the components so that the failure of one component does not result in failure of the entire blender unit.

As shown in FIG. 9E, some configurations of blending system 910 can include a control cabin 901. Control cabin can house one or more control systems (e.g., 1010, 501, 601), such as displays and interfaces that can be utilized by an operator. The control system can actuate one or more valves, pumps, or motors, to control the flow of fluid and additives within blender system, as described herein. For example, control system can operate each of first and second blending unit independently during normal operations. For example, the first blending unit can be configured to provide different sand concentrations, a different amount of fluid volumes, different chemical loadings, different treatment schedules, as compared to the second blending unit. In some configurations, such as during failure of one of the blending units, the control system can be configured to operate the remaining blending unit while the unactive blending unit is repaired or replaced. In configurations in which the blending units are operating for different well sites (e.g., in simultaneous fracturing operations), a single blending unit can be utilized to temporarily supply the required fluid mixture to both well sites until operations can be stopped or the other blending unit can be repaired.

In some configurations, the described components (e.g., pumps, 925, 929, mixing tubs 916, or the like) can be modular components that are configured to be removably coupled to the trailer, as described herein, for easy replacement. Although not shown herein, a proppant transport system (e.g., 412), chemical additive unit (e.g., 409), dry additive unit, or the like can be coupled directly to the first mixing system 916*a* and second mixing system 916*b*. For example, the proppant transport system (e.g., 412) can be directly coupled to a valve or pump disposed on top of first mixing system 916*a* and second mixing system 916*b* to add proppant directly to the tub without introducing proppant to the piping of first and second suction pump systems 922*a*, 922*b*.

Figure 10:
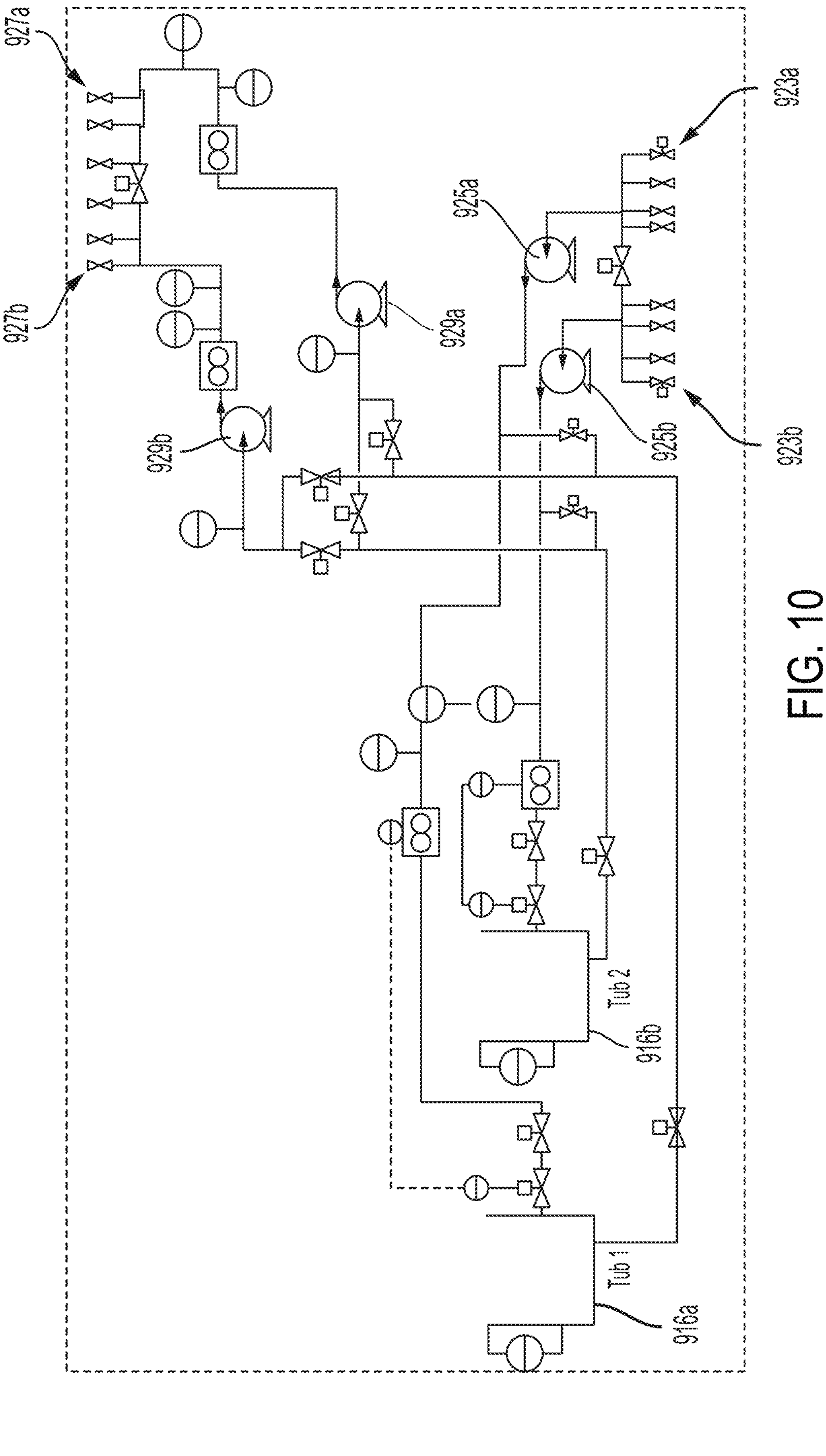
FIG. 10 shows a schematic operational diagram of the blending system of FIG. 9A.

As an illustrative example, FIG. 10 depicts a schematic operation diagram of blending system 910 including a first set of suction ports 923*a*, a second set of suction ports 923*b*, a first suction pump 925*a*, a second suction pump 925*b*, a first tub 916*a*, a second tub 916*b*, a first discharge pump 929*a*, a second discharge pump 929*b*, a first set of discharge ports 927*a*, and a second set of discharge ports 927*b*. As shown, fluid can be drawn from suction ports 923*a* to first suction pump 925*a* or to second suction pump 925*b* via a first crossover line 928*a*. In some configurations, fluid can be drawn from suction ports 923*b* to second suction pump 925*b* or to first suction pump 925*a* via the first crossover line 928*a*.

Fluid from first suction pump 925*a* can be transferred to an inlet of first tub 916*a* or to an inlet of second tub 916*b* via a second crossover line. For example, the piping between first suction pump 925*a* can extend between first tub 916*a* and second tub 916*b* and the flow path can be controlled via actuation of valves. In some configurations, fluid from second suction pump 925*b* can be transferred to an inlet of second tub 916*b* or to an inlet of first tub 916*a* via the second crossover line. Fluid from first tub 916*a* can be drawn to first discharge pump 929*a* or second discharge pump 929*b* via a crossover line. For example, the piping between first tub 916*a* can extend to first discharge pump 929*a* and second discharge pump 929*b* and the flow path can be controlled via actuation of valves (e.g., first tub-first pump valve, first tub-second pump valve). In some configurations, fluid from second tub 916*b* can be drawn to second discharge pump 929*b* or first discharge pump 929*a* via a crossover line. For example, the piping between second tub 916*b* can extend to first discharge pump 929*a* and second discharge pump 929*b* and be controlled via the actuation of valves. Fluid from first discharge pump 929*a* can be transferred to discharge ports 927*a* or discharge ports 927*b* via a crossover line. In some configurations, fluid from second discharge pump 929*b* can be transferred to discharge ports 927*b* or discharge ports 927*a* via a crossover line.

As shown in FIG. 10, blending system 910 can include a plurality of valves are disposed within blending system 910 and can be actuated by control system to direct the flow path of fluid between the Discharge pumps, Suctions pumps, Tubs, and other components of the blending system. As depicted, blending system 910 can be able to operate multiple blending units independently while also providing redundancy to operate each blending unit through any of the Discharge pumps, Suctions pumps, and Tubs in the event of failure of a blending component. As described herein, blending system 910 can define a plurality of different flow paths between each of the components of the first and second blending units and control system can adjust the flow path based on data or other operations described herein.

References are made to block diagrams of systems, methods, and apparatuses, according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks can be performed by remote processing devices linked through a communications network.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A system, comprising:
- a first tub mixer configured to mix liquid and solid particulates to form a slurry;
- a second tub mixer configured to mix liquid and solid particulates to form a slurry;
- a first suction pump configured to draw fluid from a plurality of first suction ports and deliver the fluid to the first tub mixer;
- a second suction pump configured to draw fluid from a plurality of second suction ports and deliver the fluid to the second tub mixer;
- a first discharge pump configured to draw fluid from the first tub mixer; and
- a second discharge pump configured to draw fluid from the second tub mixer, wherein:
- the first tub mixer is positioned upstream of the first discharge pump and configured to mix the liquid and solid particulates independent of the first discharge pump; and
- the second tub mixer is positioned upstream of the second discharge pump and configured to mix the liquid and solid particulates independent of the second discharge pump.

2. The system of claim 1, further comprising a first crossover line having a first crossover valve, the first crossover line configured to fluidly connect the first tub mixer to the second discharge pump based on actuation of the first crossover valve.

3. The system of claim 2, further comprising a second crossover line having a second crossover valve, the second crossover line configured to fluidly connect the second tub mixer to the first discharge pump based on actuation of the second crossover valve.

4. The system of claim 1, further comprising a first crossover line having a first crossover valve, the first crossover line configured to fluidly connect the first tub mixer to the second suction pump based on actuation of the first crossover valve.

5. The system of claim 4, further comprising a second crossover line having a second crossover valve, the second crossover line configured to fluidly connect the second tub mixer to the first suction pump based on actuation of the second crossover valve.

6. The system of claim 1, further comprising:
- a first blending unit including the first tub mixer, the first suction pump, and the first discharge pump; and
- a second blending unit including the second tub mixer, the second suction pump, and the second discharge pump; and wherein:
- the first blending unit is configured to operate with the slurry; and
- while the first blending unit operates with the slurry, the second blending unit is configured to operate with a clean fluid that is free of solid particulates; and
- the first blending unit is not in fluid communication with the second blending unit.

7. The system of claim 6, wherein the first blending unit and the second blending unit are disposed on a trailer.

8. The system of claim 6, comprising:
- a controller in communication with a crossover line that is in fluid communication with the first and second blending units; and
- wherein the controller is configured to actuate a crossover valve on the crossover line such that the first blending unit is in fluid communication with the second blending unit.

9. The system of claim 8, wherein the controller is configured to:
- determine a failure event for a component of the first or second blending unit; and
- based on the failure event, actuate the crossover valve to switch a flow path to bypass the component.

10. The system of claim 6, wherein:
the first blending unit comprises:
the plurality of first suction ports in communication with the first suction pump; and
a plurality of first discharge ports configured to receive fluid form the first discharge pump; and
the second blending unit comprises:
the plurality of second suction ports in communication with the second suction pump; and
a plurality of second discharge ports configured to receive fluid form the second discharge pump.

11. A multi-blender system for blending liquid and solid particulates together to prepare a fracturing fluid, the multi-blender system comprising:
a first tub mixing system configured to mix fluid with solid particulates;
a second tub mixing system configured to mix fluid with solid particulates;
a first suction pump system configured to draw fluid into the first tub mixing system and the second tub mixing system;
a second suction pump system configured to draw fluid into the first tub mixing system and the second tub mixing system;
a first discharge pump system configured to draw fluid from the first tub mixing system and the second tub mixing system; and
a second discharge pump system configured to draw fluid from the first tub mixing system and the second tub mixing system;
wherein the first and second tub mixing systems are separate from the first and second suction pump systems and the first and second discharge pump systems.

12. The system of claim 11, wherein the first and second tub mixing systems, the first and second suction pump systems, and the first and second discharge pump systems are disposed on a single trailer.

13. The system of claim 12, further comprising a separate centrifugal pump not disposed on the trailer, wherein the separate centrifugal pump is configured to pump fresh water in a split streaming operation.

14. The system of claim 12, wherein the first discharge pump is configured to provide a first fluid to a first fracturing fleet in fluid communication with a first well and the second discharge pump is configured to provide a second fluid to a second fracturing fleet in fluid communication with a second well.

15. The system of claim 14, further comprising a separate centrifugal pump not disposed on the trailer, wherein the separate centrifugal pump in fluid communication with the first and second wells.

* * * * *